(12) United States Patent
Kono et al.

(10) Patent No.: US 8,447,941 B2
(45) Date of Patent: May 21, 2013

(54) POLICY BASED DATA MIGRATION CONTROL METHOD FOR STORAGE DEVICE

(75) Inventors: Yasutaka Kono, Yokohama (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 444 days.

(21) Appl. No.: 12/621,121

(22) Filed: Nov. 18, 2009

(65) Prior Publication Data

US 2011/0082988 A1    Apr. 7, 2011

(30) Foreign Application Priority Data

Oct. 5, 2009    (JP) ................................. 2009-231107

(51) Int. Cl.
*G06F 13/00*    (2006.01)

(52) U.S. Cl.
USPC ........... 711/162; 711/161; 711/165; 711/154; 714/4.11; 707/827

(58) Field of Classification Search ................. 711/160, 711/161, 165, 154, 162; 714/6, 4.11; 707/827
See application file for complete search history.

(56) References Cited

U.S. PATENT DOCUMENTS

| | | | |
|---|---|---|---|
| 5,956,750 | A | 9/1999 | Yamamoto et al. |
| 6,108,748 | A | 8/2000 | Ofek et al. |
| 6,895,483 | B2 | 5/2005 | Eguchi et al. |
| 7,149,859 | B2 * | 12/2006 | Fujibayashi .................. 711/162 |
| 7,318,083 | B2 | 1/2008 | Senda |
| 7,461,196 | B2 * | 12/2008 | Kawamura et al. ............... 711/2 |
| 7,962,704 | B2 * | 6/2011 | Fujibayashi et al. .......... 711/154 |
| 2003/0055890 | A1 | 3/2003 | Senda |
| 2004/0083339 | A1 | 4/2004 | Yamamoto et al. |
| 2006/0005074 | A1 | 1/2006 | Yanai et al. |

(Continued)

FOREIGN PATENT DOCUMENTS

| JP | 2000-293317 A | 10/2000 |
|---|---|---|
| JP | 2003-067187 A | 3/2003 |

(Continued)

OTHER PUBLICATIONS

European Patent Office extended search report on application No. 10182189.0 dated Oct. 21, 2011; 8 pages.

*Primary Examiner* — Hong Kim
(74) *Attorney, Agent, or Firm* — Foley & Lardner LLP

(57) ABSTRACT

In recent years reducing the operating cost of storage devices (hereafter, also referred to as storage sub-systems) has been an important task for the management of storage systems. As one method for solving this task, data life cycle management, in which data is relocated from, for example, a new storage sub-system to an older storage sub-system in accordance with how new the data is or the frequency of use of the data, has become important. One technology for achieving data life cycle management is technology for migrating the contents of a storage area (hereafter referred to as "volume") of a storage sub-system to another volume without affecting the host computer that uses the volume. In the present invention, when an associated source volume (for example, the source volume in a copy pair association) of a pair of associated volumes (or groups) is migrated, migration of an associated destination volume (for example, the target volume in the copy pair association) is also controlled. In this way, it is possible to control the migration of a pair (or a group) of associated volumes in accordance with the user's requirements.

13 Claims, 36 Drawing Sheets

U.S. PATENT DOCUMENTS

| | | |
|---|---|---|
| 2006/0010169 A1* | 1/2006 | Kitamura .................. 707/200 |
| 2006/0085607 A1 | 4/2006 | Haruma |
| 2006/0014348 A1 | 6/2006 | Takahashi et al. |
| 2006/0218366 A1* | 9/2006 | Fukuda et al. ............. 711/165 |
| 2007/0055713 A1 | 3/2007 | Nagai et al. |
| 2007/0113037 A1 | 5/2007 | Eguchi et al. |
| 2007/0239954 A1 | 10/2007 | Sakashita et al. |
| 2008/0082777 A1 | 4/2008 | Sakaguchi et al. |
| 2009/0300079 A1* | 12/2009 | Shitomi .................... 707/204 |
| 2010/0274825 A1* | 10/2010 | Nemoto et al. ............ 707/812 |
| 2011/0264855 A1* | 10/2011 | Kasako .................... 711/114 |

FOREIGN PATENT DOCUMENTS

| | | |
|---|---|---|
| JP | 2003-345522 A | 12/2003 |
| JP | 2006-099748 A | 4/2006 |
| JP | 2007-066259 A | 3/2007 |

* cited by examiner

FIG. 2

| Initiator ID | Target ID | LUN | MIGRATION STATUS |
|---|---|---|---|
| 00.00.00.00.11.11.11.11 | 11.11.11.11.22.22.22.22 | 1 | - |
| 00.00.00.00.22.22.22.22 | 11.11.11.11.33.33.33.33 | 3 | - |
| 00.00.00.00.66.66.66.66 | 11.11.11.11.33.33.33.33 | 100 | MIGRATING |
| ⋮ | ⋮ | ⋮ | ⋮ |

| LUN | SEGMENT ID | VOLUME LBA AREA | PHYSICAL RESOURCE ID | LBA AREA |
|---|---|---|---|---|
| 1 | 0 | 0-999 | DISK 0 | 0-999 |
| 1 | 1 | 1000-1999 | DISK 0 | 1000-1999 |
| 3 | 0 | 0-999 | DISK 1 | 0-999 |
| 3 | 1 | 1000-1999 | DISK 2 | 0-999 |
| 3 | 2 | 2000-1999 | - | - |
| 100 | 0 | 0-999 | MEMORY 0 | 1000-1999 |
| 100 | 1 | 1000-1999 | DISK 3 | 0-999 |
| ⋮ | ⋮ | ⋮ | ⋮ | ⋮ |

| STORAGE SUB-SYSTEM ID | LUN | CAPACITY | RESOURCE TYPE | PATH FLAG | IOPS | ASSOCIATED DESTINATION LUN |
|---|---|---|---|---|---|---|
| USP_V.16100 | 0 | 100GB | SSD | NO | 0 | 2 |
| USP_V.16100 | 1 | 100GB | SSD | NO | 0 | 3 |
| USP_V.16100 | 2 | 100GB | SAS | NO | 0 | - |
| USP_V.16100 | 3 | 100GB | SAS | YES | 1000 | - |
| USP_V.16100 | 10 | 100GB | SATA | NO | 0 | - |
| USP_V.16100 | 20 | 100GB | SATA | YES | 2000 | 10 |
| ... | ... | ... | ... | ... | ... | ... |

| TIER ID (41400) | STORAGE SUB-SYSTEM ID (41401) | LUN (41402) |
|---|---|---|
| 0 | USP_V.16100 | 0 |
| 0 | USP_V.16100 | 1 |
| 1 | USP_V.16100 | 2 |
| 1 | USP_V.16100 | 3 |
| 2 | USP_V.16100 | 10 |
| 2 | USP_V.16100 | 20 |
| ⋮ | ⋮ | ⋮ |

FIG. 6

| POLICY ID (41500) | MIGRATION CONDITION (41501) | MIGRATION DESTINATION TIER ID (41502) |
|---|---|---|
| 0 | 10000<IOPS | 0 |
| 1 | 3000<IOPS<10000 | 1 |
| 2 | 0<IOPS<3000 | 2 |
| ⋮ | ⋮ | ⋮ |

FIG. 7

| ASSOCIATED POLICY ID (41600) | TIMING (41601) | CONDITION (41602) | POLICY (41603) |
|---|---|---|---|
| 0 | WHEN MIGRATING ASSOCIATED SOURCE VOLUME | — | IN ACCORDANCE WITH ASSOCIATED SOURCE VOLUME |
| 1 | WHEN MIGRATING ASSOCIATED SOURCE VOLUME | — | IN ACCORDANCE WITH POLICY ID = {1, 2} |
| 2 | WHEN MIGRATING ASSOCIATED SOURCE VOLUME | — | IN ACCORDANCE WITH THE SAME TIER ID AS THE TIER ID OF THE MIGRATION DESTINATION OF THE ASSOCIATED SOURCE VOLUME |
| 3 | WHEN SYNCHRONIZING DATA FROM ASSOCIATED SOURCE VOLUME TO ASSOCIATED DESTINATION VOLUME | ASSOCIATED SOURCE VOLUME RESOURCE TYPE = SSD | IN ACCORDANCE WITH ASSOCIATED SOURCE VOLUME |
| 4 | WHEN SYNCHRONIZING DATA FROM ASSOCIATED SOURCE VOLUME TO ASSOCIATED DESTINATION VOLUME | ASSOCIATED SOURCE VOLUME RESOURCE TYPE = SSD | IN ACCORDANCE WITH POLICY ID = {1, 2} |
| ... | ... | ... | ... |

FIG. 8

| STORAGE SUB-SYSTEM ID (41700) | LUN (41701) | POLICY ID (41702) | ASSOCIATED POLICY ID (41703) |
|---|---|---|---|
| USP_V.16100 | 0 | 0,1,2 | 0 |
| USP_V.16100 | 1 | 0,1 | 1 |
| USP_V.16100 | 2 | - | - |
| USP_V.16100 | 3 | - | - |
| USP_V.16100 | 10 | - | - |
| USP_V.16100 | 20 | 1,2 | 3,4 |
| ⋮ | ⋮ | ⋮ | ⋮ |

UI1100 LIST OF LOGICAL VOLUMES UI1100

| | STORAGE SUB-SYSTEM ID | LUN | CAPACITY | RESOURCE TYPE |
|---|---|---|---|---|
| | USP_V.16100 | 0 | 100GB | SSD |
| | USP_V.16100 | 1 | 100GB | SSD |
| | USP_V.16100 | 2 | 100GB | SAS |
| | USP_V.16100 | 3 | 100GB | SAS |
| ✓ | USP_V.16100 | 10 | 100GB | SATA |
| ✓ | USP_V.16100 | 20 | 100GB | SATA |

LIST OF STORAGE TIERS UI1200

| TIER ID | STORAGE SUB-SYSTEM ID | LUN |
|---|---|---|
| 0 | USP_V.16100 | 0 |
| 0 | USP_V.16100 | 1 |
| 1 | USP_V.16100 | 2 |
| 1 | USP_V.16100 | 3 |

UI1300 — [ ADD ]   UI1400 — [ DELETE ]

UI3100
LIST OF ASSOCIATED POLICIES

| ASSOCIATED POLICY ID | TIMING | POLICY |
|---|---|---|
| 0 | WHEN MIGRATING ASSOCIATED SOURCE VOLUME | IN ACCORDANCE WITH ASSOCIATED SOURCE VOLUME |

UI3300    UI3200 — [ DELETE ]

UI3310
TIMING | WHEN MIGRATING ASSOCIATED SOURCE VOLUME ▽
UI3320 | WHEN COPYING DATA FROM ASSOCIATED SOURCE VOLUME TO ASSOCIATED DESTINATION VOLUME

CONDITION | ASSOCIATED SOURCE VOLUME RESOURCE TYPE ▽
UI3321 | ASSOCIATED SOURCE VOLUME IOPS
UI3322 — [ = ▽ ]
          [ = ]
UI3323 — [                              ]

POLICY | IN ACCORDANCE WITH ASSOCIATED SOURCE VOLUME ▽
UI3330 | IN ACCORDANCE WITH POLICY ID (SPECIFIED BELOW)
         IN ACCORDANCE WITH ASSOCIATED SOURCE VOLUME AND TIER ID

UI3340
LIST OF MIGRATION POLICIES

| POLICY ID | MIGRATION ID | MIGRATION DESTINATION TIER ID |
|---|---|---|
| 0 | 10000<IOPS | 0 |
| 1 | 3000<IOPS<10000 | 1 |
| 2 |  | 2 |

UI3350 — [ ADD ]

LIST OF LOGICAL VOLUMES   UI4100

|   | STORAGE SUB-SYSTEM ID | LUN | CAPACITY | RESOURCE TYPE |
|---|---|---|---|---|
|   | USP_V.16100 | 0 | 100GB | SSD |
|   | USP_V.16100 | 1 | 100GB | SSD |
|   | USP_V.16100 | 2 | 100GB | SAS |
|   | USP_V.16100 | 3 | 100GB | SAS |
| ✓ | USP_V.16100 | 10 | 100GB | SATA |
| ✓ | USP_V.16100 | 20 | 100GB | SATA |

LIST OF MIGRATION POLICIES   UI4200

|   | POLICY ID | MIGRATION CONDITION | MIGRATION DESTINATION TIER ID |
|---|---|---|---|
|   | 0 | 10000<IOPS | 0 |
| ✓ | 1 | 3000<IOPS<10000 | 1 |
|   | 2 |  | 2 |

LIST OF ASSOCIATED POLICIES   UI4300

|   | ASSOCIATED POLICY ID | TIMING | POLICY |
|---|---|---|---|
| ✓ | 0 | WHEN MIGRATING ASSOCIATED SOURCE VOLUME | IN ACCORDANCE WITH ASSOCIATED SOURCE VOLUME |

UI4400 — [ ALLOCATE ]

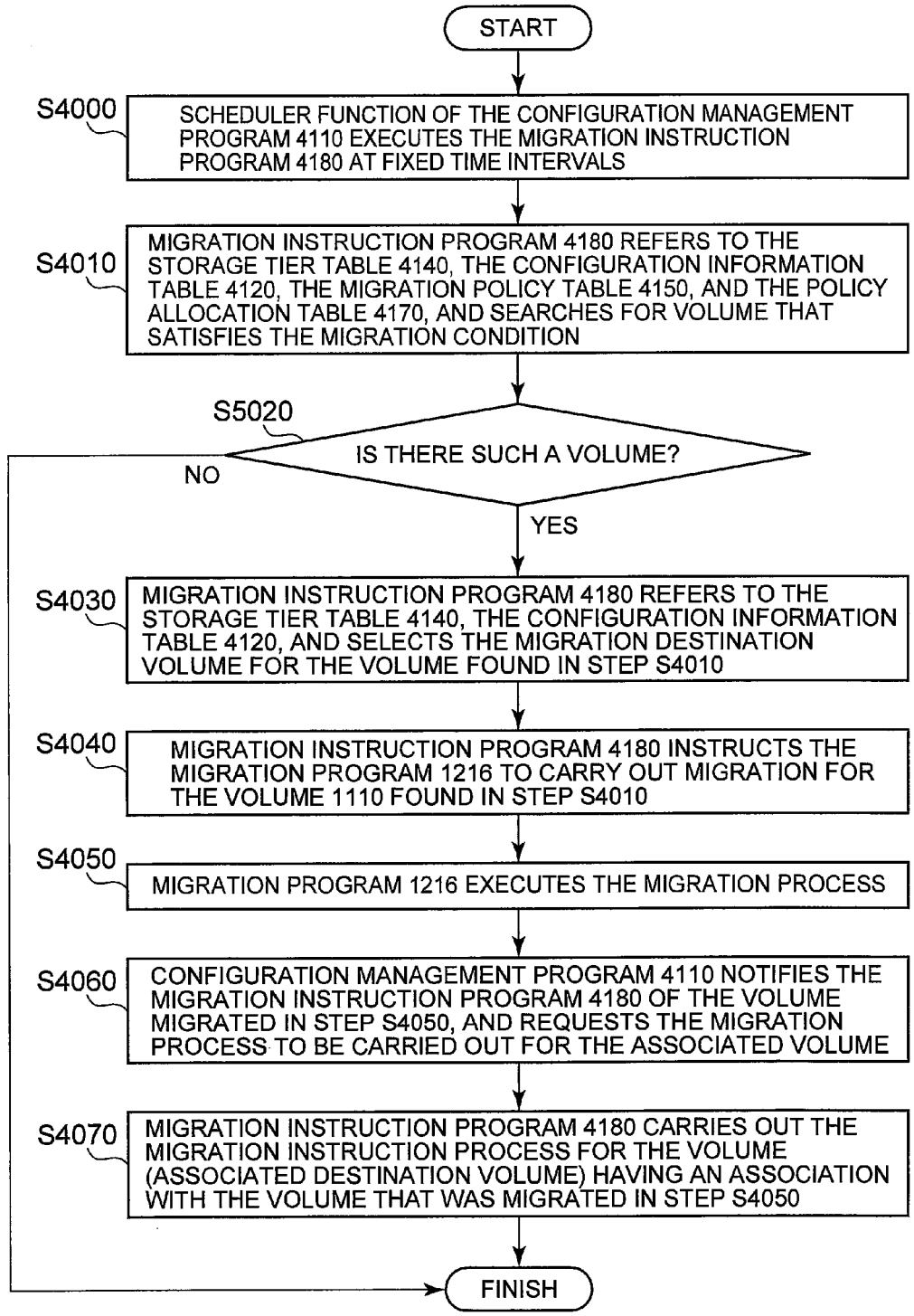

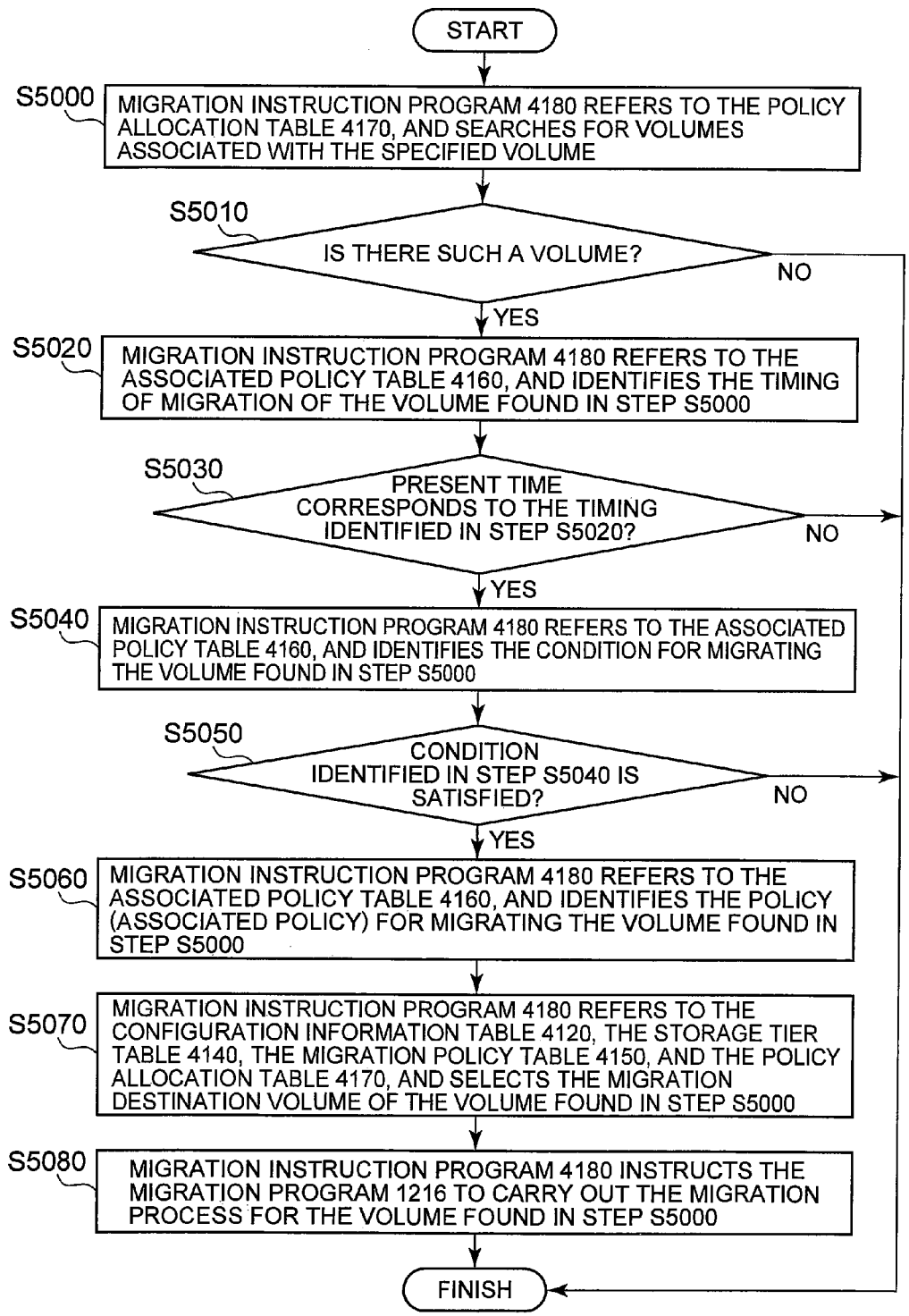

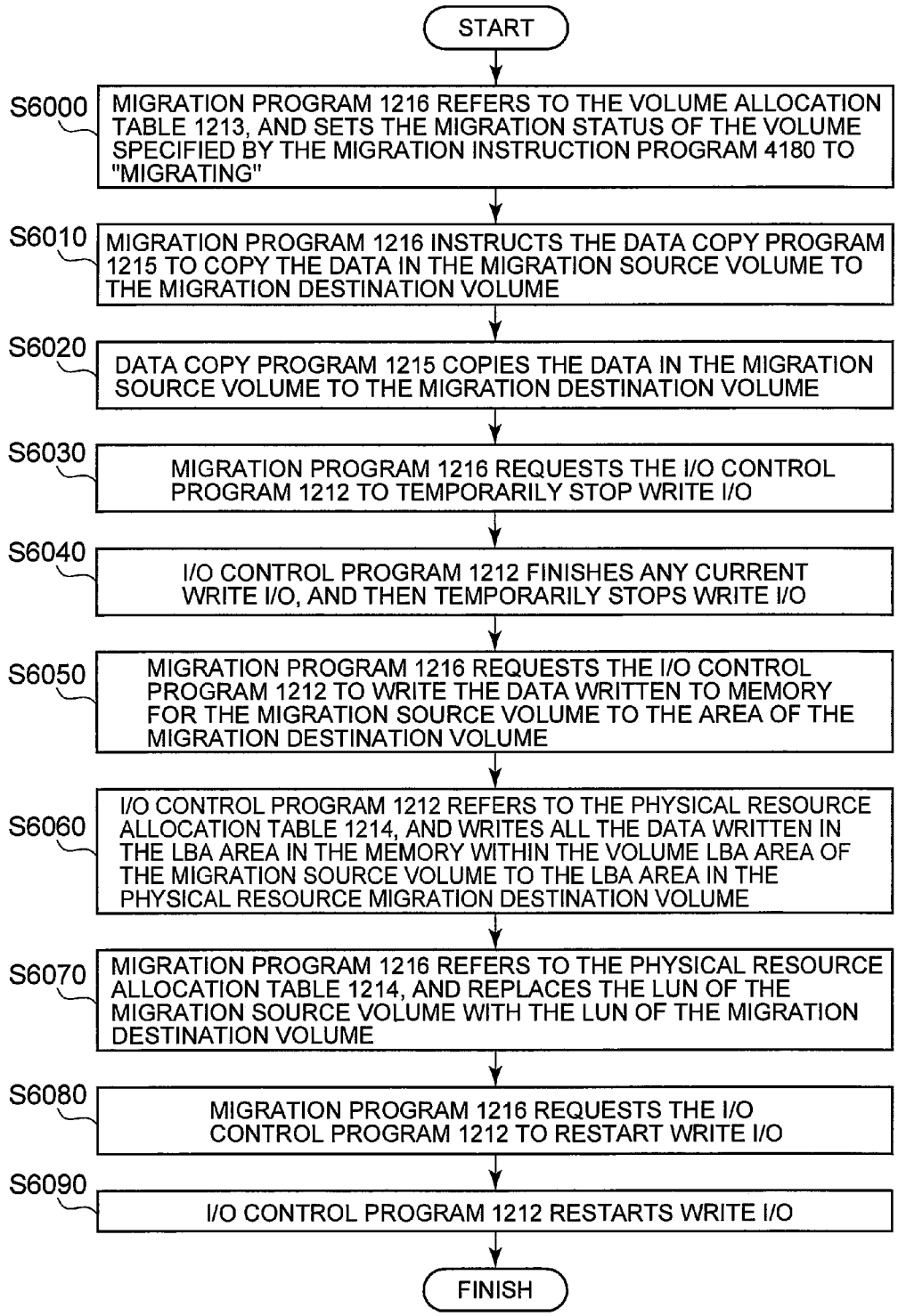

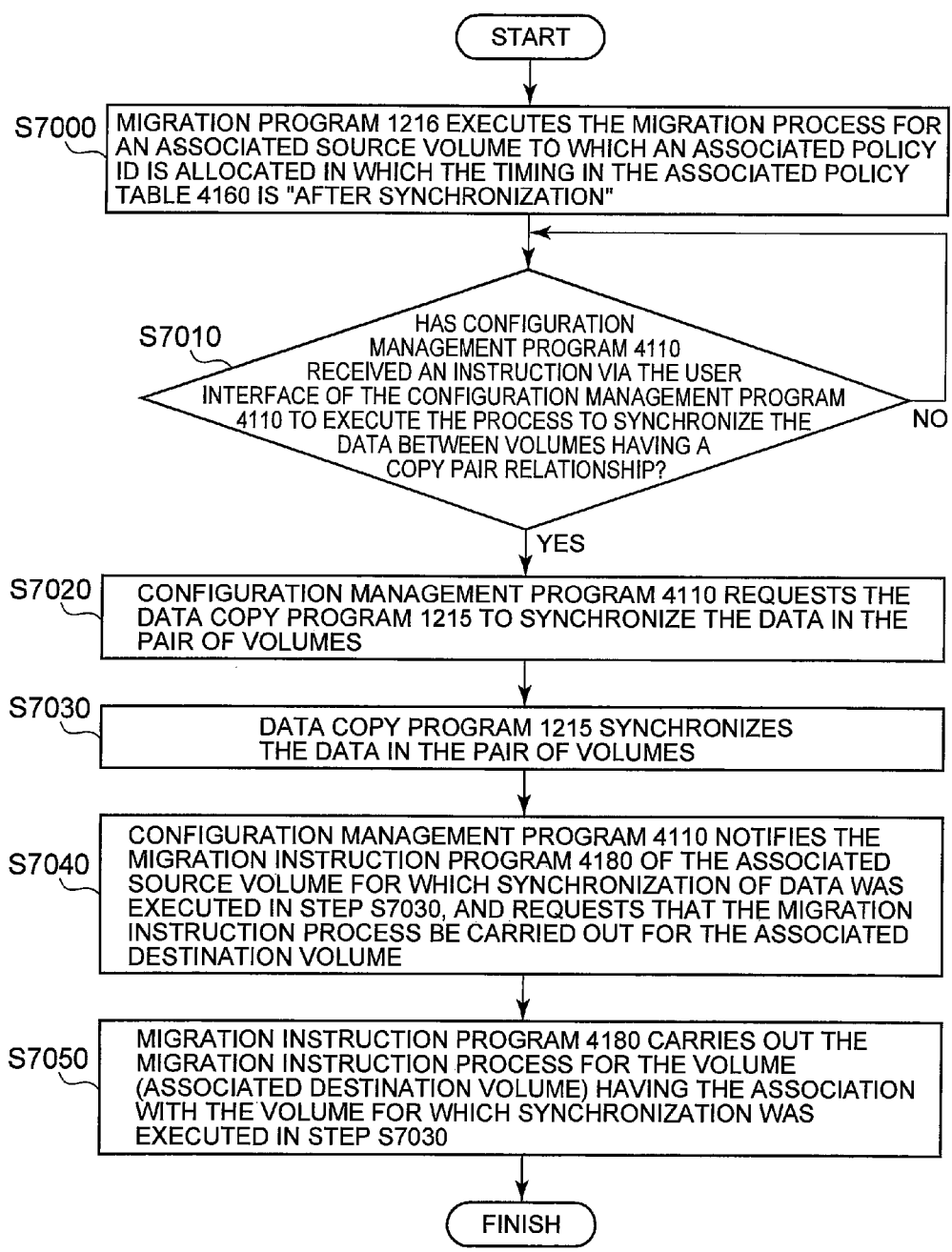

LIST OF LOGICAL VOLUMES HAVING A COPY PAIR RELATIONSHIP  UI5100

|   | COPY SOURCE | | COPY DESTINATION | | |
|---|---|---|---|---|---|
|   | STORAGE SUB-SYSTEM ID | LUN | STORAGE SUB-SYSTEM ID | LUN | |
|   | USP_V.16100 | 0 | USP_V.16100 | 4 | |
|   | USP_V.16100 | 1 | USP_V.16100 | 5 | |
|   | USP_V.16100 | 2 | USP_V.16100 | 6 | |
|   | USP_V.16100 | 3 | USP_V.16100 | 7 | |
| ✓ | USP_V.16100 | 10 | USP_V.16100 | 11 | |
| ✓ | USP_V.16100 | 20 | USP_V.16100 | 21 | |

UI5200 — [SYNCHRONIZE]

FIG. 23

| STORAGE SUB-SYSTEM ID 41200 | LUN 41201 | CAPACITY 41202 | RESOURCE TYPE 41203 | PATH FLAG 41204 | IOPS 41205 | ASSOCIATED DESTINATION STORAGE SUB-SYSTEM ID 41206b | ASSOCIATED DESTINATION LUN 41206 |
|---|---|---|---|---|---|---|---|
| USP_V.16100 | 0 | 100GB | SSD | NO | 0 | USP_V.16100 | 2 |
| USP_V.16100 | 1 | 100GB | SSD | NO | 0 | USP_V.16100 | 3 |
| USP_V.16100 | 2 | 100GB | SAS | NO | 0 | – | – |
| USP_V.16100 | 3 | 100GB | SAS | YES | 1000 | – | – |
| USP_V.16100 | 10 | 100GB | SATA | NO | 0 | – | – |
| USP_V.16100 | 20 | 100GB | SATA | YES | 2000 | AMS.77000 | 10 |
| ... | ... | ... | ... | ... | ... | ... | ... |

FIG. 24

| TIER ID | STORAGE SUB-SYSTEM ID | LUN | SECOND STORAGE SUB-SYSTEM ID | SECOND LUN |
|---|---|---|---|---|
| 41400 | 41401 | 41402 | 41403b | 41404b |
| 0 | USP_V.16100 | 0 | AMS.77000 | 100 |
| 0 | USP_V.16100 | 1 | AMS.77000 | 101 |
| 1 | USP_V.16100 | 2 | AMS.77000 | 102 |
| 1 | USP_V.16100 | 3 | AMS.77000 | 0 |
| 2 | USP_V.16100 | 10 | AMS.77000 | 2 |
| 2 | USP_V.16100 | 20 | AMS.77000 | 5 |
| ⋮ | ⋮ | ⋮ | ⋮ | ⋮ |

FIG. 27

| Initiator ID | Target ID | LUN | MIGRATION STATUS |
|---|---|---|---|
| 00.00.00.00.11.11.11.11 | 11.11.11.11.22.22.22.22 | 1 | – |
| 00.00.00.00.22.22.22.22 | 11.11.11.11.33.33.33.33 | 3 | – |
| 00.00.00.00.66.66.66.66 | 11.11.11.11.33.33.33.33 | 100 | MIGRATING |
| ⋮ | ⋮ | ⋮ | ⋮ |

| LUN | SEGMENT ID | VOLUME LBA AREA | PHYSICAL RESOURCE ID | LBA AREA | MIGRATION STATUS |
|---|---|---|---|---|---|
| 1 | 0 | 0-999 | DISK 0 | 0-999 | – |
| 1 | 1 | 1000-1999 | DISK 0 | 1000-1999 | – |
| 3 | 0 | 0-999 | DISK 1 | 0-999 | – |
| 3 | 1 | 1000-1999 | DISK 2 | 0-999 | MIGRATING |
| 3 | 2 | 2000-2999 | – | – | – |
| 100 | 0 | 0-999 | MEMORY 0 | 1000-1999 | – |
| 100 | 1 | 1000-1999 | DISK 3 | 0-999 | MIGRATING |
| ⋮ | ⋮ | ⋮ | ⋮ | ⋮ | ⋮ |

| STORAGE SUB-SYSTEM ID | LUN | SEGMENT ID | RESOURCE TYPE | IOPS |
|---|---|---|---|---|
| USP_V.16100 | 0 | 0 | SSD | 5000 |
| USP_V.16100 | 0 | 1 | SAS | 1000 |
| USP_V.16100 | 0 | 2 | SAS | 0 |
| USP_V.16100 | 1 | 0 | SAS | 0 |
| USP_V.16100 | 1 | 1 | SAS | 0 |
| USP_V.16100 | 2 | 0 | SATA | 1000 |
| USP_V.16100 | 3 | 0 | SSD | 1000 |
| USP_V.16100 | 3 | 1 | SAS | 0 |
| USP_V.16100 | 10 | 0 | SSD | 0 |
| USP_V.16100 | 10 | 1 | SAS | 100 |
| USP_V.16100 | 20 | 0 | SSD | 2000 |
| USP_V.16100 | 20 | 1 | SAS | 1000 |
| ⋮ | ⋮ | ⋮ | ⋮ | ⋮ |

| TIER ID | STORAGE SUB-SYSTEM ID | POOL ID | FREE CAPACITY | RESOURCE TYPE |
|---|---|---|---|---|
| 0 | USP_V.16100 | 0 | 300GB | SSD |
| 0 | USP_V.16100 | 1 | 300GB | SSD |
| 1 | USP_V.16100 | 2 | 500GB | SAS |
| 1 | USP_V.16100 | 3 | 1TB | SAS |
| 2 | USP_V.16100 | 10 | 5TB | SATA |
| 2 | USP_V.16100 | 20 | 2TB | SATA |
| ⋮ | ⋮ | ⋮ | ⋮ | ⋮ |

| TIER ID 41400 | STORAGE SUB-SYSTEM ID 41401 | POOL ID 41402c | FREE CAPACITY 41403c | RESOURCE TYPE 41404c | SECOND STORAGE SUB-SYSTEM ID 41405e | SECOND POOL ID 41406e | SECOND VACANT CAPACITY 41407e | SECOND RESOURCE TYPE 41408e |
|---|---|---|---|---|---|---|---|---|
| 0 | USP_V.16100 | 0 | 300GB | SSD | AMS.77000 | 100 | 200GB | SSD |
| 0 | USP_V.16100 | 1 | 300GB | SSD | AMS.77000 | 101 | 200GB | SSD |
| 1 | USP_V.16100 | 2 | 500GB | SAS | AMS.77000 | 102 | 1TB | SATA |
| 1 | USP_V.16100 | 3 | 1TB | SAS | AMS.77000 | 0 | 2TB | SATA |
| 2 | USP_V.16100 | 10 | 5TB | SATA | AMS.77000 | 2 | 5TB | SATA |
| 2 | USP_V.16100 | 20 | 2TB | SATA | AMS.77000 | 5 | 3TB | SATA |
| ... | ... | ... | ... | ... | ... | ... | ... | ... |

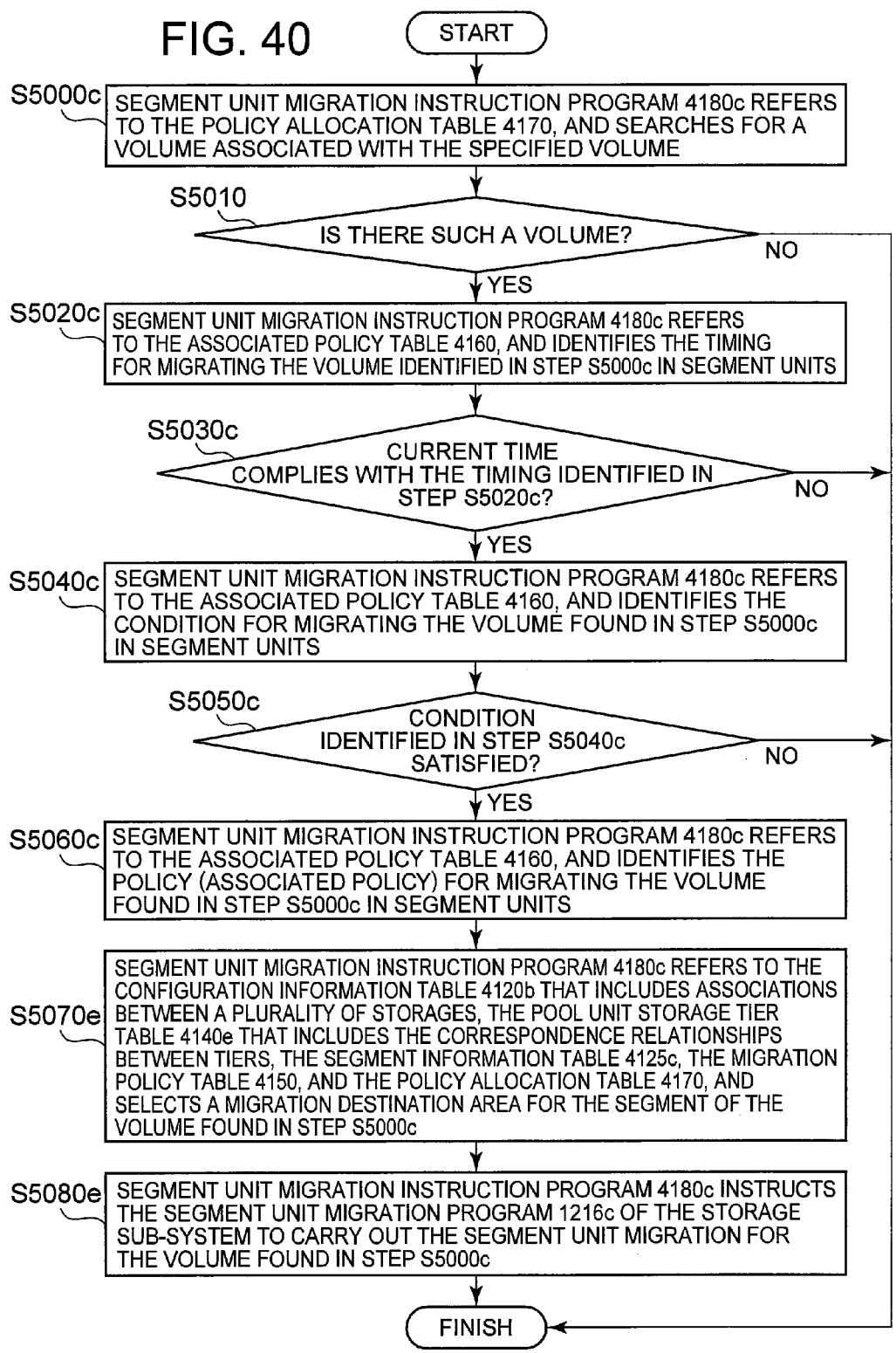

POLICY BASED DATA MIGRATION CONTROL METHOD FOR STORAGE DEVICE

CROSS-REFERENCE TO PRIOR APPLICATION

This application relates to and claims the benefit of priority from Japanese Patent Application number 2009-231107, filed on Oct. 5, 2009 the entire disclosure of which is incorporated herein by reference.

BACKGROUND

The present invention generally relates to the configuration management of a storage device, and more particularly to a data migration control method for a storage device.

In recent years, the volume of data used by corporations and individuals has increased dramatically. Therefore storage systems that use technology such as Storage Area Networks (SAN) or Network Attached Storage (NAS) that enable flexible data management by connecting storage sub-systems and host computers via switches or hubs have become widely used.

Also, in recent years reducing the operating cost of storage devices (hereafter, also referred to as storage sub-systems) has been an important task for the management of storage systems. Data life cycle management, in which data is relocated from, for example, a new storage sub-system to an older storage sub-system in accordance with how new the data is or the frequency of use of the data, has become important as one method for solving this task (the group of data relocation source and data relocation destination storage sub-systems is referred to as a storage tier).

One technology for achieving data life cycle management is technology for migrating the contents of a storage area (hereafter referred to as "volume") of a storage sub-system to another volume without affecting the host computer that uses the volume.

Methods for carrying out migration include, for example, the methods disclosed in Japanese Patent Application Laid-open No. 2000-293317, U.S. Pat. No. 6,108,748, and Japanese Patent Application Laid-open No. 2003-345522. In these methods, first data is copied from a certain volume to another volume, and the data in the copy source is deleted. Address management of the copy source and copy destination is processed by an address management program. If the address is accessed from a host computer during data migration, an access processing program provides the host with data at an address managed by the address management program in the event of a read request. In the event of a write request, the data written to cache memory is retained, and later the data is written to the volume at the migration destination. By using the above processes, it is possible to interchange volumes. The data migration destination can be a volume within the same storage sub-system (see Japanese Patent Application Laid-open No. 2000-293317), a volume in a different storage sub-system (see U.S. Pat. No. 6,108,748), or volumes in different storage sub-systems managed as a single virtual storage sub-system (see Japanese Patent Application Laid-open No. 2003-345522).

Also, in Japanese Patent Application Laid-open No. 2003-067187, a method of automatically migrating data based on the logical volume performance information and the input/output (I/O) access frequency is disclosed. Also, in Japanese Patent Application Laid-open No. 2007-066259, a method of migrating data in units of the segments that constitute a logical volume in accordance with the frequency of I/O access to the logical volume from host computers is disclosed.

SUMMARY

Using the conventional technology, it is possible to achieve data life cycle management by migrating data in logical volume units or in units of the segments that constitute a logical volume in accordance with the frequency of I/O access from the host computer to the logical volume.

However, the conventional technology methods do not take into consideration associations between logical volumes when migrating data. For example, if the data within a certain logical volume has the association that it is copied to a separate logical volume (hereafter referred to as a copy pair association), normally the I/O access frequency to the copy source volume (hereafter also referred to as the P-Vol) is different from the I/O access frequency to the copy destination volume (hereafter also referred to as the S-Vol). This is because during normal operation, there are write and read accesses to the P-Vol from the host computer, but in contrast there is only write access to the S-Vol for data copying. In this type of configuration, with the conventional technology methods, the P-Vol and S-Vol are migrated based on their separate access frequencies. As stated previously, normally the S-Vol has lower access frequency compared with the P-Vol, so the S-Vol can be more easily migrated to a lower quality of service (QoS) volume (or segment) compared with the P-Vol. Therefore if for example a fault occurs to the P-Vol and the host computer uses the S-Vol, the I/O performance can suddenly deteriorate. This situation may not conform to the user's requirements.

In the present invention, when the associated source volume (for example, the P-Vol in a copy pair association) of a pair of associated volumes (or groups) is migrated, migration of the associated destination volume (for example, the S-Vol in a copy pair association) is also controlled. Specifically, the computer system according to the present invention has a storage system that includes one or a plurality of storage devices having a plurality of storage areas, and a controller that controls data migration. When the controller migrates first data in a first storage area from the first storage area to a second storage area, the controller migrates second data in a third storage area that is associated with the first storage area, from the third storage area to a fourth storage area that is selected in accordance with a policy defined for storage areas associated with the first storage area.

According to the present invention, it is possible to control the migration of a pair (or a group) of associated volumes in accordance with the user's requirements. For example, when the volume has been migrated, it is also possible to migrate volumes associated with the volume. The units migrated are either volumes or segments that constitute volumes, but the present invention is not limited to this.

BRIEF DESCRIPTION OF THE DRAWINGS

FIG. 2 is a diagram showing an example of a volume allocation table;

FIG. 3 is a diagram showing an example of a physical resource allocation table;

FIG. 4 is a diagram showing an example of a configuration information table;

FIG. 5 is a diagram showing an example of a storage tier table;

FIG. 6 is a diagram showing an example of a migration policy table;

FIG. 7 is a diagram showing an example of an associated policy table;

FIG. 8 is a diagram showing an example of a policy allocation table;

FIG. 12 is a diagram showing an example of the user interface of the migration setting program for setting the storage tier;

FIG. 14 is a diagram showing an example of the user interface of the migration setting program for setting the associated policy;

FIG. 15 is a diagram showing an example of the user interface of the migration setting program for setting the policy allocation;

FIG. 16 is a diagram showing an example of the migration instruction process;

FIG. 17 is a diagram showing an example of the migration instruction process for associated destination volumes;

FIG. 18 is a diagram showing an example of the migration process;

FIG. 19 is a diagram showing an example of the data synchronization process between logical volumes having a copy pair relationship;

FIG. 20 is a diagram showing an example of the user interface of the configuration management program for carrying out the data synchronization process between logical volumes having a copy pair relationship;

FIG. 23 is a diagram showing an example of a configuration information table that includes associations between multiple storages;

FIG. 24 is a diagram showing an example of a storage tier table that includes the correspondence relationships between tiers;

FIG. 27 is a diagram showing an example of the volume allocation table;

FIG. 28 is a diagram showing an example of the physical resource allocation table that includes the migration status;

FIG. 29 is a diagram showing an example of the segment information table;

FIG. 30 is a diagram showing an example of the pool unit storage tier table;

FIG. 39 is a diagram showing an example of the pool unit storage tier table that includes the correspondence relationships between tiers; and FIG. 40 is a diagram showing an example of the segment unit migration instruction process for the associated destination volumes.

DETAILED DESCRIPTION OF THE EMBODIMENT

In one embodiment of the present invention, the policy regarding migration is set for the associated source volume and associated destination volume (hereafter referred to as the migration policy), and the migration is controlled based on this policy. The migration policy states the conditions for migration of a logical volume or the segments that constitute a logical volume.

In the associated source volume migration policy, the policy regarding conditions such as, for example, the I/O access frequency to the logical volume (IOPS: Input Output Per Second) and the importance at a particular time of the data stored in the logical volume may be stated. Also, in the associated destination volume migration policy, the policy regarding the application of the associated source volume migration policy to the associated destination volume, or the policy regarding the associated destination volume, independent of the associated source volume migration policy (migration conditions and migration destination storage tier) may be stated.

The storage sub-system or the storage management computer controls both migration in respect of the associated source volume and migration in respect of the associated destination volume based on the policy.

Next, the embodiments of the present invention are explained based on the following examples. The present invention is not limited by the examples.

A. First Example:
B. Second Example:
C. Third Example:
D. Fourth Example:
E. Fifth Example:

A. FIRST EXAMPLE

<<A1. System Configuration>>

Figure 1:
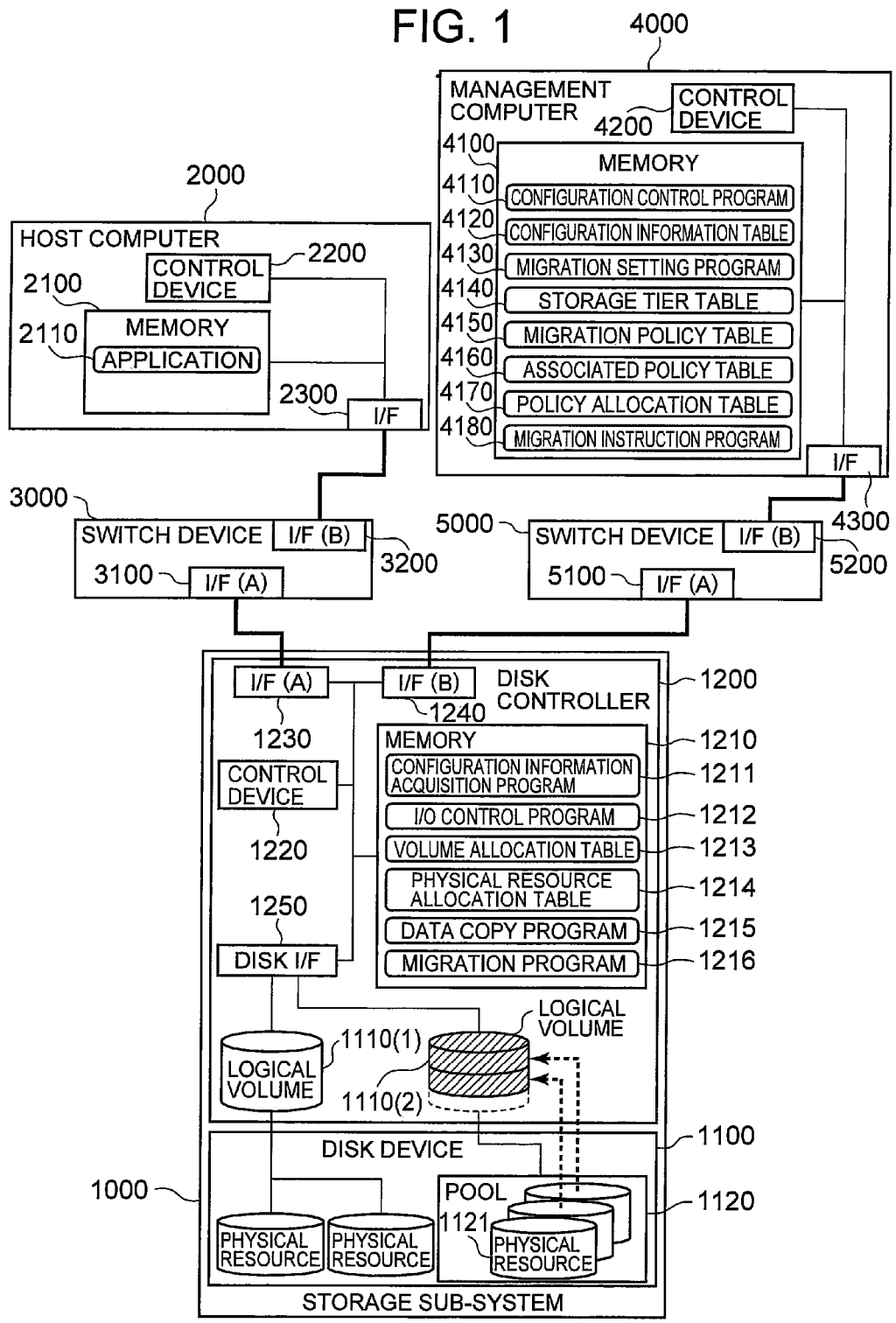
FIG. 1 is a diagram showing the system configuration in a first example.

FIG. 1 is an explanatory diagram showing the configuration of a data processing system as an example of the present invention. The data processing system includes a storage sub-system 1000, a host computer 2000, a switch device 3000, a management computer 4000, and a switch device 5000. The figure shows one each of the storage sub-system 1000, the host computer 2000, the switch device 3000, the management computer 4000, and the switch device 5000. However, this is not a limitation, and there may be more than one of each.

The storage sub-system 1000 and the host computer 2000 are connected in a network via the switch device 3000. Also, the storage sub-system 1000 and the management computer 4000 are connected in a network via the switch device 5000. The switch device 3000 and the switch device 5000 may be the same device.

The storage sub-system 1000 includes a disk device 1100 and a disk controller 1200.

The disk device 1100 includes a physical resource 1121 and a pool 1120. Here, the physical resource 1121 indicates a storage area resource provided by a hard disk drive (HDD), a solid state drive (SSD), or the like. There is no particular limitation regarding the type of physical device providing the physical resource 1121. Also, the pool 1120 is a group of physical resources 1121. Normally the pool 1120 is constituted with redundant physical resources 1121 using a technology known as RAID (Redundant Array of Independent Disks). However this is not a limitation, and the physical resource 1121 may be grouped. In the figure, one pool 1120 and five physical resources 1121 are shown, but this is not a limitation, and one or more may be used.

The disk controller 1200 includes a memory 1210, a control device 1220, an interface (I/F) 1230 for connecting to the switch device 3000, an interface I/F 1240 for connecting to the switch device 5000, and a disk interface I/F 1250 for connecting to the disk device 1100. These constitutive elements are connected via a bus.

The disk controller 1200 further includes a logical volume 1110. The logical volume 1110 indicates a logical storage area, and is constituted from one or more physical resources, and is provided to the host computer 2000 by the disk controller 1200. Here, logical volume 1110(1) is constituted from one or a plurality of physical resources 1121 allocated in advance. The capacity of the logical volume 1110(1) is equal to the sum of the capacities of the physical resources 1121 that constitute the logical volume 1110(1). Also, the logical volume 1110 (2) is a virtual logical volume provided to the host computer 2000, to which physical resources 1121 are allocated in accordance with write requests from the host computer 2000. Specifically, when the disk controller 1200 receives a data write request for the logical volume 1110(2), if physical resources have not been allocated to the area that is the subject of the write request, a storage area of the physical resource 1121 is allocated to the logical volume 1100(2), and the data is written to the storage area of the physical resource that was allocated. In this way, the storage capacity of the logical volume 1110(2) provided to the host computer 2000 can be made greater by the total capacity of the physical resources 1121 actually allocated.

In the figure there is one each of the above two types of logical volume 1110. However, this is not a limitation, and there may be only one of the two types, or the two types may be mixed, or there may be one or more logical volumes 1110.

The memory 1210 stores programs and data used by the control device 1220. In particular the memory 1210 includes a configuration information acquisition program 1211, an I/O control program 1212, a volume allocation table 1213, a physical resource allocation table 1214, a data copy program 1215, and a migration program 1216.

The configuration information acquisition program 1211 is a program that collects configuration information on the storage sub-system 1000, and transmits the information to other programs.

The I/O control program 1212 is a program that controls I/O access from the host computer 2000 to the logical volume 1110 possessed by the storage sub-system 1000.

The volume allocation table 1213 is a table that stores information on the logical volumes 1110 allocated to the host computer 2000, and a specific example is shown in FIG. 2. The volume allocation table 1213 includes an initiator ID 12120 for identifying the I/F 2300 of the host computer 2000, a target ID 12121 for identifying the I/F(A) 1230 of the storage sub-system 1000, a logical unit number (LUN) 12122 for identifying the logical volume 1110, and the migration status 12123 indicating the status of the migration process for the logical volume 1110. In FIG. 2, the world wide name (WWN) of the I/F 2300 of the host computer 2000 and the WWN of the I/F(A) of the storage sub-system 1000 are used in the initiator ID 12120 and the target ID 12121. However, this is not a limitation, and information capable of uniquely identifying these may be used in the initiator ID 12120 and the target ID 12121. Also, in FIG. 2, the LUN 12122 is used as the identifier of the logical volume 1110, but this is not a limitation, and information capable of uniquely identifying the logical volume 1110 may be used. Further, in FIG. 2, the hyphen and "migrating" are the two types of status used in the migration status 12123. Here, the hyphen indicates that the volume is not being migrated, and "migrating" indicates that the volume is being migrated. However, the information stored in the migration status 12123 and the method of indicating it are not limited. Other information indicating the migration status may be stored, and the status may be expressed using other methods of indication.

FIG. 3 shows an example of the physical resource allocation table 1214 in the present example. The physical resource allocation table 1214 is a table that stores information regarding the allocation of physical resources to each segment of the logical volume 1110. The physical resource allocation table 1214 includes a LUN 12130 for identifying the logical volume 1110; a segment ID 12131 for identifying the segments within the logical volume 1110; a volume logical block address (LBA) area 12132 for identifying the area of each segment of the logical volume 1110; a physical resource ID 12133 for identifying the physical resource 1121 allocated to each segment of the logical volume 1110, and an LBA area 12134 for identifying the storage area of the physical resource 1121 allocated to each segment of the logical volume 1110. However, other information may be used for the LUN 12130, the segment ID 12131, and the physical resource ID 12133, provided that it is capable of uniquely identifying the logical volume 1110, the segment within the logical volume 1110, and the physical resource 1121, respectively, and the information is not limited to that tabulated in FIG. 3. Also, the volume LBA area 12132 and the LBA area 12134 are not limited to the information shown in FIG. 3, and other information may be used provided it is capable of uniquely identifying the area of each segment within the logical volume 1110 and the storage area within the physical resource 1121.

The data copy program 1215 is a program for copying the data in the logical volume 1110 to a different logical volume 1110. The units for copying the data may be the whole logical volume 1110 or it may be in units of the segments that constitute the logical volume 1110.

The migration program 1216 is a program for migrating a logical volume 1110 to another logical volume 1110. When migrating a logical volume 1110, the migration program 1216 first copies the data from the volume to a different volume, and then deletes the data from the copy source volume. The address management of the copy source and the copy destination data is processed by an address management program. If there is an access from the host computer 2000 to this address while migrating data, an access processing program provides the host with the data at the address managed by the address management program in the event of a request to read data. For a request to write data, the write data is held in cache memory, and the data is later written to the migration destination volume. The migration program 1216 interchanges the logical volumes by carrying out the above processes. The migration method is not limited to this, and other methods may be used.

The control device 1220 controls the execution of programs within the memory 1210 and the input and output of data, and controls the input and output of data and control commands via each I/F of the disk controller 1200.

In addition, the storage sub-system 1000 includes functions that are common in storage devices, such as a function to constitute a pool 1120 from physical resources 1121, a function for generating logical volumes 1110 from the pool 1120, a function for allocating a logical volume 1110 to the host computer 2000 via the I/F(A) 1230, a function for receiving storage sub-system 1000 configuration change requests from the management computer 4000, and so on.

In addition, the storage sub-system 1000 may include an input device for the user of the storage sub-system 1000 to input data, or an output device for displaying information to the user of the storage sub-system 1000. However, these devices have no direct relationship with the present invention, so they have been omitted from the drawings.

The host computer 2000 includes a memory 2100, a control device 2200, and the I/F 2300 for connecting to the switch device 3000. These constituent elements are connected via a bus. The memory 2100 stores programs and data used by the control device 2200. In particular, the memory 2100 stores applications 2110. The applications 2110 may be any program. The control device 2200 controls the execution of programs in the memory 2100 and the input and output of data, and controls the input and output of data and control commands via the I/F 2300.

In addition the host computer 2000 may include an input device for the user of the host computer 2000 to input data, or an output device for displaying information to the user of the host computer 2000. However, these devices have no direct relationship with the present invention, so they have been omitted from the drawings.

The switch device 3000 includes an I/F 3100 for connecting to the storage sub-system 1000, and an I/F 3200 for connecting to the host computer 2000. The network protocol used by the storage sub-system 1000, the host computer 2000, and the switch device 3000 that connects the two may be fiber channel (FC), iSCSI, or the like, but is not particularly limited to these. Also, the figure shows one each of the I/F 3100 and the I/F 3200, but this is not a limitation, and there may be one or more of each.

The management computer 4000 includes a memory 4100, a control device 4200, and an I/F 4300 for connecting to the switch device 5000. The memory 4100 stores programs and data used by the control device 4200. In particular, the memory 4100 includes a configuration management program 4110, a configuration information table 4120, a migration setting program 4130, a storage tier table 4140, a migration policy table 4150, an associated policy table 4160, a policy allocation table 4170, and a migration instruction program 4180.

The configuration management program 4110 is a program for managing the configuration of the storage sub-system 1000. In particular the configuration management program 4110 has the function of acquiring the configuration information of the storage sub-system 1000 by communicating with the configuration information acquisition program 1211 of the storage sub-system 1000. The configuration management program 4110 may also include a function of configuring a pool 1120 from the physical resources 1121, a function for generating logical volumes 1110 from the pool 1120, a function for allocating logical volumes to the host computer 2000 via the I/F(A) 1230, and a scheduler function for carrying out specific processes at specific times.

FIG. 4 is a diagram showing an example of the configuration information table 4120 in the present example. The configuration information table 4120 is a table for storing configuration information of the storage sub-system 1000. The configuration information table 4120 includes a storage sub-system ID 41200 for identifying the storage sub-system 1000; a LUN 41201 for identifying the logical volumes 1110 of the storage sub-system 1000, a capacity 41202 of the logical volume 1110; a resource type 41203 for indicating the type of physical resource that constitutes the logical volume 1110; a path flag 41204 that indicates whether or not the logical volume 1110 is allocated to the host computer 2000; an IOPS 41205 that indicates the frequency of I/O access to the logical volume 1110 from the host computer 2000; and an associated destination LUN 41206 for identifying other logical volumes 1110 having an association with the logical volume 1110. The information stored in the configuration information table 4120 is not limited to this, and other information relating to the configuration of the storage sub-system 1000 may also be stored in the configuration information table 4120. Also, the storage sub-system ID 41200, the LUN 41201, and the associated destination LUN 41206 are not limited to the expressions in the figure, but any information capable of uniquely identifying the storage sub-system 1000, the logical volume 1110, and other logical volumes 1110 associated with logical volume 1110 may be used. In the present example, when a hyphen is stored in the associated destination LUN 41206, it indicates that there is no other logical volume 1110 associated with the volume. When the identifier of a logical volume is stored in the associated destination LUN 41206, the volume, in other words the logical volume indicated by the LUN 41201, is an associated destination volume, indicating that the logical volume indicated by the associated destination LUN 41206 is associated as an associated destination logical volume. Further, the capacity 41202, the resource type 41203, the path flag 41204, and the IOPS 41205 are not limited to the expressions in the figure. Other information that indicates the capacity of the logical volume 1110, the type of physical resource 1121 that constitutes the logical volume 1110, information indicating whether or not the logical volume 1110 is allocated to the host computer 2000, and information indicating the frequency of I/O access from the host computer 2000 to the logical volume 1110, respectively, may be used.

The migration setting program 4130 is a program that carries out setting regarding the migration of the logical volume 1110. In the present example, the migration setting program 4130 carries out the creation of storage tiers, setting the policy for migration of the logical volume 1110 (hereafter also referred to as the migration policy), setting the policy for migration of other logical volumes 1110 having an association with the volume (hereafter also referred to as the associated policy), and setting the allocation of the migration policies and the associated policies to logical volumes. In the present example, these settings are carried out by a user (storage administrator) via a user interface (UI) of the migration setting program 4130. However, the method of carrying out these settings for migration is not limited to this, and other methods may be used. For example, the storage tier setting may be carried out automatically by the migration setting program 4130, by the method of gathering together, in the same storage tier, the volumes with the same resource type and RAID level among the logical volumes 1110. Also, the associated policy setting may be carried out automatically by the migration setting program 4130, according to the type of association between the logical volume 1110 and the other logical volumes 1110. A method for this purpose can be, for example, when a certain logical volume 1110 is in a synchronous copy relationship with another logical volume 1110, when migrating the associated source volume, to set a policy to also migrate the associated destination volume.

FIG. 5 is a diagram showing an example of the storage tier table 4140 in the present example. The storage tier table 4140 is a table that stores information regarding storage tiers (the data relocation destination group of logical volumes). The storage tier table 4140 includes a tier ID 41400 for identifying the storage tier, a storage sub-system ID 41401 for identifying the storage sub-system 1000 having the logical volume 1110 that is included in the storage tier, and a LUN 41402 for identifying the logical volume 1110 that is included in the storage tier. The tier ID 41400, the storage sub-system ID 41401, and the LUN 41402 are not limited to the expressions shown in the figure, and other information may be used provided it can uniquely identify the storage tier, the storage sub-system 1000, and the logical volume 1110.

FIG. 6 is a diagram showing an example of the migration policy table 4150 in the present example. The migration policy table 4150 is a table for storing policy information regarding the migration process of the logical volume 1110. The migration policy table 4150 includes a policy ID 41500 for identifying the migration policy, a migration condition 41501 indicating the condition for carrying out migration, and a migration destination tier ID 41502 for identifying the migration destination storage tier. In the present example, the condition for migrating the logical volume is stated in the migration condition 41501 based on the I/O access frequency (IOPS) from the host computer 2000 to the logical volume 1110. The policy ID 41500 and the migration destination tier ID 41502 are not limited to the expressions shown in the figure, but other information may be used provided it is capable of uniquely identifying the migration policy and the migration destination storage tier respectively. Also, the migration condition 41501 is not limited to the expression shown in the figure, and other information indicating the condition for migrating the logical volume 1110 may be used. Other conditions for migration apart from IOPS can include, for example, the importance of the data stored in the logical volume 1110, or the operating cost of the logical volume 1110, or the like.

FIG. 7 is a diagram showing an example of the associated policy table 4160 in the present example. The associated policy table 4160 is a table for storing policy information regarding the migration process of a different logical volume 1110 that is associated with the logical volume 1110. The associated policy table 4160 includes an associated policy ID 41600 for identifying the associated policy, a timing 41601 for migrating the associated destination logical volume 1110, a condition 41602 for migrating the associated destination logical volume 1110, and a policy 41603 for migrating the associated destination logical volume 1110. The associated policy ID 41600 is not limited to the expressions shown in the figure, and other information may be used provided it can uniquely identify the associated policy. Also, the timing 41601, the condition 41602, and the policy 41603 are not limited to the expressions shown in the figure, and other information indicating the timing of migration of the associated destination volume, its condition, and its policy may be used. The timing for migrating the associated destination volume may be, for example, when migrating the associated source logical volume 1110, or when synchronizing the data copy from the associated source volume to the associated destination volume, or at an arbitrary timing specified by the user, or the like. The condition for migrating the associated destination volume may be, for example, when the resource type of the associated source volume is a specified type, such as a solid state drive (SSD) or the like. By setting this condition, specifically it is possible to migrate the associated destination volume to a serial attached SCSI (SAS) when the associated source volume is migrated to an SAS. However, when the associated source volume is migrated to an SSD, the associated destination volume is not migrated. In this way, it is possible to prevent unnecessary cost expenditure on the expensive SSD physical resource. The policy when migrating the associated destination volume may be, for example, a policy to conform to the migration policy of the associated source volume, or a policy to carry out migration under a condition specified by the user, independently from the associated source volume, or a policy to make the tier ID of the migration destination of the associated destination volume the same as the tier ID of the migration destination of the associated source volume. When setting the policy for migrating the associated destination volume using the policy ID, a plurality of policy IDs may be set, provided the migration conditions are not duplicated. Also, when policy IDs are erroneously set with duplicated conditions, the user is notified by issuing an alarm or the like.

FIG. 8 is a diagram showing an example of the policy allocation table 4170 in the present example. The policy allocation table 4170 is a table showing information for allocating the migration policies and associated policies to logical volumes 1110. The policy allocation table 4170 includes a storage sub-system ID 41700 for identifying the storage sub-system 1000 having the logical volume 1110, a LUN 41701 for identifying the logical volume 1110, a policy ID 41702 for identifying the migration policy, and an associated policy ID 41703 for identifying the associated policy. The storage sub-system ID 41700, the LUN 41701, the policy ID 41702, and the associated policy ID 41703 are not limited to the expressions shown in the figure. Other information may be used provided it is capable of uniquely identifying the storage sub-system 1000, the logical volume 1110, the migration policy, and the associated policy. Further, in the policy allocation table in the present example, migration policies and associated policies are allocated for every logical volume 1110. However, this is not a limitation, and, for example, migration policies and associated policies may be allocated to logical volume 1110 groups or storage sub-systems.

The migration instruction program 4180 is a program for instructing the migration program 1216 of the storage sub-system 1000 to execute the migration process in respect of the logical volume 1110. In the present example, the migration instruction program 4180 transmits to the migration program 1216 the storage sub-system ID and LUN for identifying the logical volume 1110 of the migration destination, and instructs the migration program 1216 to execute the migration.

The control device 4200 controls the execution of programs within the memory 4100 and the input and output of data, and controls the input and output of data and control commands via the I/F 4300.

The management computer 4000 may also include an input device for the user of the management computer 4000 to input data, or an output device for displaying information to the user of the management computer 4000.

In FIG. 1, the management computer 4000 and the storage sub-system 1000 are shown as separate devices. However, this is not a limitation, and the management computer 4000 and the storage sub-system 1000 may be in the same case. Also, the programs within the memory 4100 of the management computer 4000 may also be provided within the memory 1210 of the storage sub-system 1000. In this way, by executing the programs by the control device 1220, the same functions as those of the management computer 4000 can be realized.

The switch device 5000 includes an I/F 5100 for connecting to the storage sub-system 1000, and an I/F 5200 for connecting to the management computer 4000. The network protocol used by the storage sub-system 1000, the management computer 4000, and the switch device 5000 that connects the two may be TCP/IP or the like, but there is no particular limitation. Also, the figure shows one each of the I/F 5100 and the I/F 5200, but this is not a limitation, there may be one or more of each.

<<A2. Explanation of the Data Processing Process>>

The following is an explanation of the data processing process.

Figure 9:
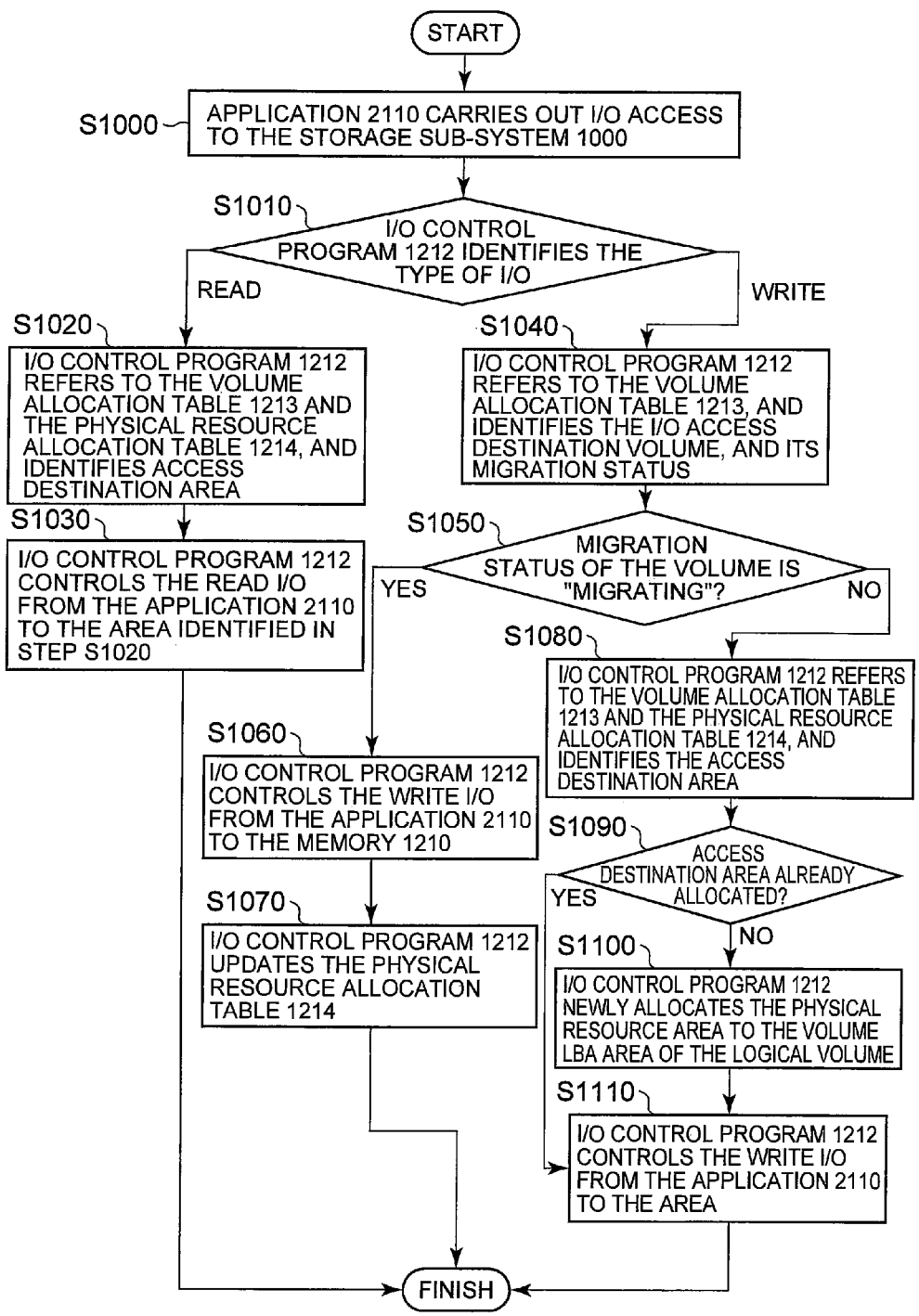
FIG. 9 is a diagram showing an example of the I/O control process.

FIG. 9 shows the sequence of the process when the I/O control program 1212 controls I/O from the host computer 2000 to the logical volume 1110.

In this process, first in step S1000, the application 2110 carries out I/O access to the storage sub-system 1000.

Next, in step S1010, the I/O control program 1212 identifies the type of I/O. Here the type of I/O is "read" or "write".

If the I/O type is "read", in step S1020 the I/O control program 1212 refers to the volume allocation table 1213 and the physical resource allocation table 1214, and identifies the LBA area 12134 of the reading access destination.

Next, in step S1030, the I/O control program 1212 controls the read access from the application 2110 to the LBA area 12134 identified in step S1020.

If the I/O type is "write", in step S1040 the I/O control program 1212 refers to the volume allocation table 1213, and identifies the LUN 12122 of the logical volume 1110 of the write access destination, and its migration status 12123.

Next, in step S1050, the I/O control program 1212 determines whether or not the migration status 12123 of the volume is "migrating".

If the migration status 12123 is "migrating", in step S1060 the I/O control program 1212 controls the write access from the application 2110 to the memory 1210. Here, the write access destination is not limited to the memory 1210, but may be cache memory provided in the control device 1220, another logical volume 1110, or the like.

Further, in step S1070, the I/O control program 1212 updates the physical resource allocation table 1214, and sets the physical resource ID corresponding to the volume LBA area 12132 that was the subject of the write access as the identifier of the memory 1210, and sets the LBA area 12134 as the storage area identifier of the memory 1210.

If the migration status 12123 is not "migrating", in step S1080 the I/O control program 1212 refers to the volume allocation table 1213 and the physical resource allocation table 1214, and identifies the write access destination LBA area 12134.

Next, the I/O control program 1212 determines whether or not the write access destination LBA area 12134 in step S1080 is already allocated. In the present example, when a hyphen only is stored in the LBA area 12134 in the physical resource allocation table 1214, it is determined that the physical resource LBA area is not allocated to the volume LBA area.

If the write access destination LBA area 12134 is already allocated, in step S1110 the I/O control program 1212 controls the write I/O from the application 2110 to the LBA area.

If the write access LBA area 12134 is not allocated, in step S1100 the I/O control program 1212 newly allocates the physical resource LBA area to the volume LBA area 12132 of the logical volume 1110 that is the subject of the I/O access. The method of determining the newly allocated physical resource LBA area may be by searching from the top of the physical resource LBA area, and selecting the first area that satisfies the necessary capacity, or the like, but there is no particular limitation on the method used. After executing step S1100, the process proceeds to step S1110.

Figure 10:
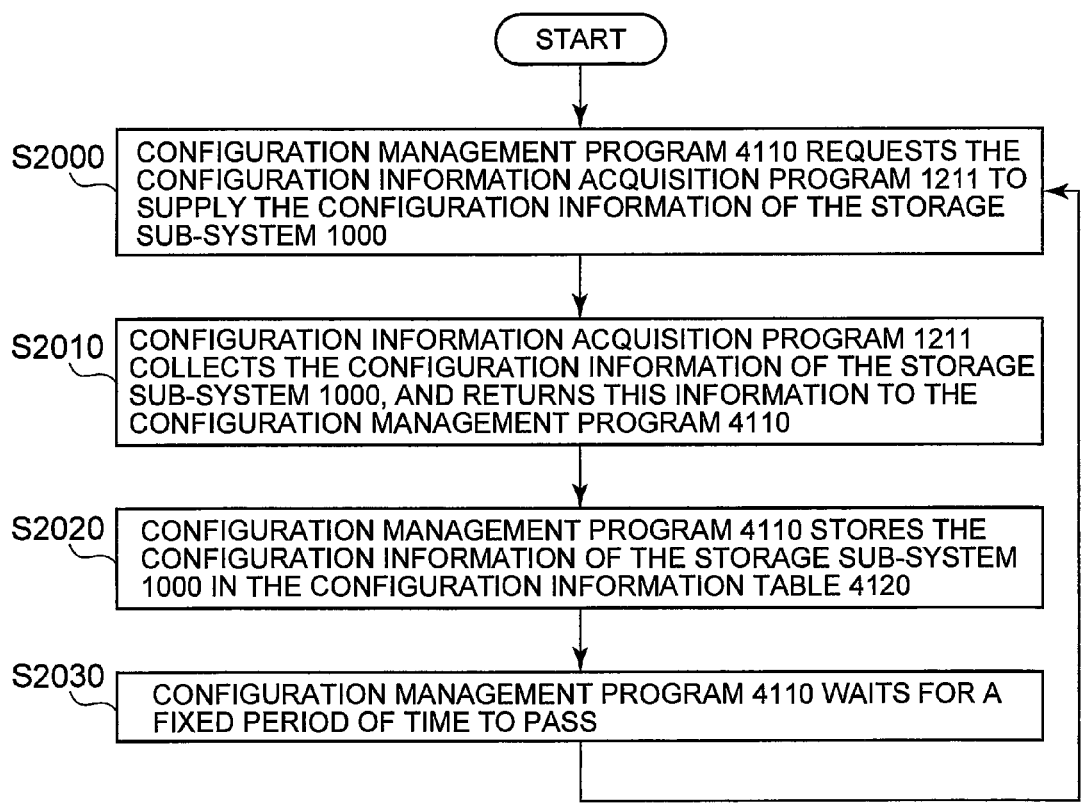
FIG. 10 is a diagram showing an example of the configuration information acquisition process.

FIG. 10 shows the sequence of the process when the configuration management program 4110 acquires configuration information of the storage sub-system 1000 in the present example. In the present example, the sequence of the process in FIG. 10 is executed in parallel with other processes of the programs of the management computer 4000.

In this process, first in step S2000, the configuration management program 4110 requests the configuration information acquisition program 1211 to supply the configuration information of the storage sub-system 1000.

Next, in step S2010, the configuration information acquisition program 1211 collects the configuration information of the storage sub-system 1000, and returns this information to the configuration management program 4110. In the present example, the configuration information acquisition program 1211 returns the information indicated by the configuration information table 4120 as the configuration information of the storage sub-system 1000, but other information in addition to this may also be returned.

In step S2020, the configuration management program 4110 stores the configuration information of the storage sub-system 1000 in the configuration information table 4120.

Next, in step S2030, the configuration management program 4110 waits for a fixed period of time to pass, and then proceeds to step S2000. The length of time that the configuration management program 4110 waits in step S2030 may be predetermined by the configuration management program 4110, or it may be determined by the user, or it may be set by another method.

Figure 11:
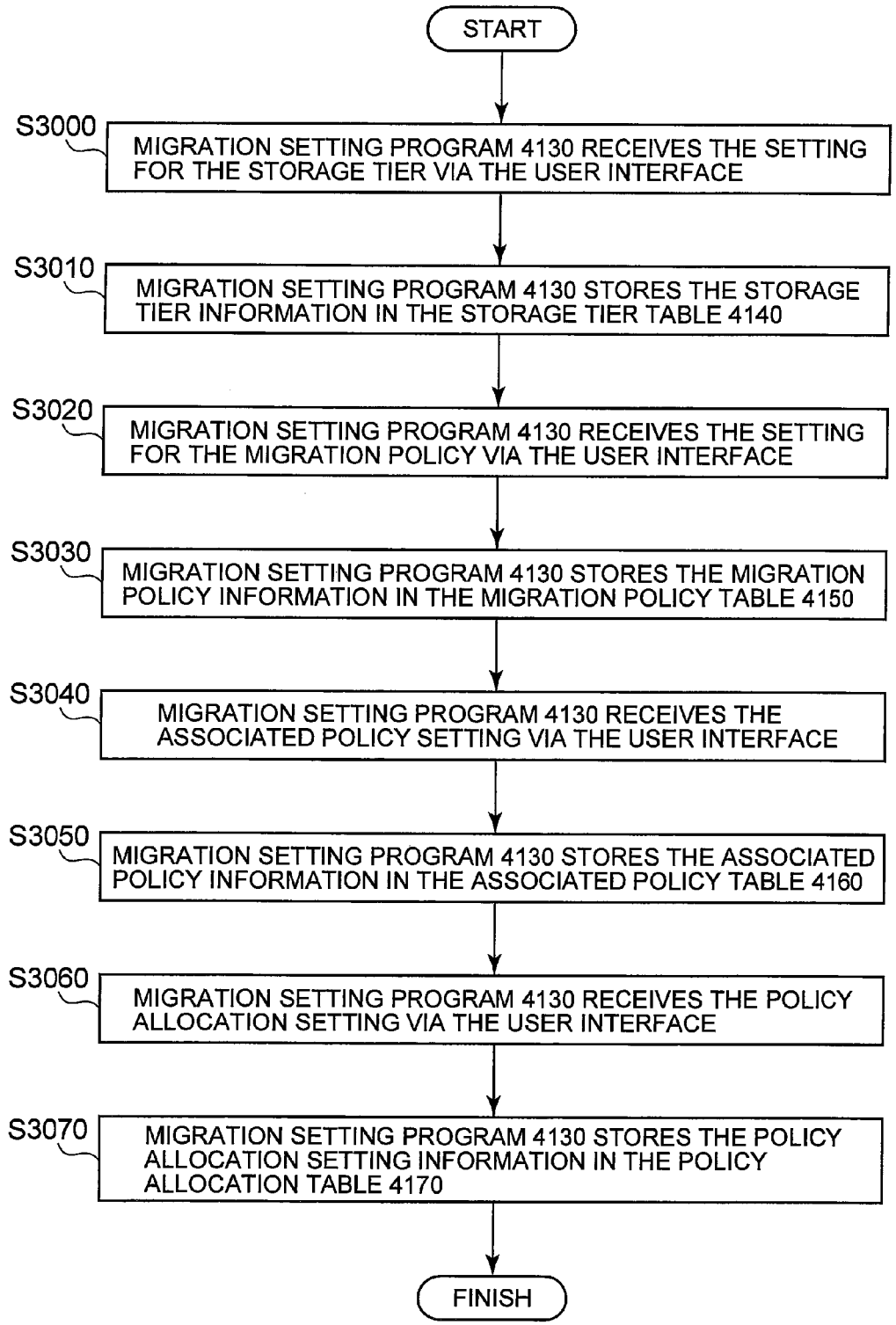
FIG. 11 is a diagram showing an example of the migration setting process.

FIG. 11 shows the sequence of the process when carrying out setting for the migration of the logical volume 1110 in the present example.

In this process, first in step S3000 the migration setting program 4130 receives the setting for the storage tier from the user (storage administrator) via the user interface of the migration setting program 4130.

FIG. 12 shows a user interface UI1000 used by the user for setting the storage tier in the present example. The user interface UI1000 includes a table UI1100 that displays a list of logical volumes 1110, a table UI1200 that displays a list of storage tiers, a button UI1300 for adding a logical volume 1110 to a storage tier, and a button UI1400 for deleting a logical volume 1110 from a storage tier. The table UI1100 of the list of logical volumes and the table UI1200 of the list of storage tiers have check boxes, so that the user can select each line of each table.

The user selects the logical volume 1110 that is to be added to the storage tier from the table UI1100 of the list of logical volumes, and selects the storage tier to which the logical volume 1110 is to be added from the table UI1200 of the list of storage tiers. In the present example, if one storage tier has not been selected in the table UI1200 of the list of storage tiers, a new storage tier is generated. When the user presses the button UI1300, the logical volume 1110 is added to the storage tier. When deleting a logical volume 1110 from a storage tier, the user selects the line that is to be deleted from the table UI1200 of the list of storage tiers, and presses the button UI1400. In the present example, if there is no logical volume 1110 in the storage tier, the storage tier is automatically deleted.

Next, in step S3010, the migration setting program 4130 stores the storage tier information in the storage tier table 4140.

Next, in step S3020, the migration setting program 4130 receives the setting for the migration policy from the user via the user interface of the migration setting program 4130.

Figure 13:
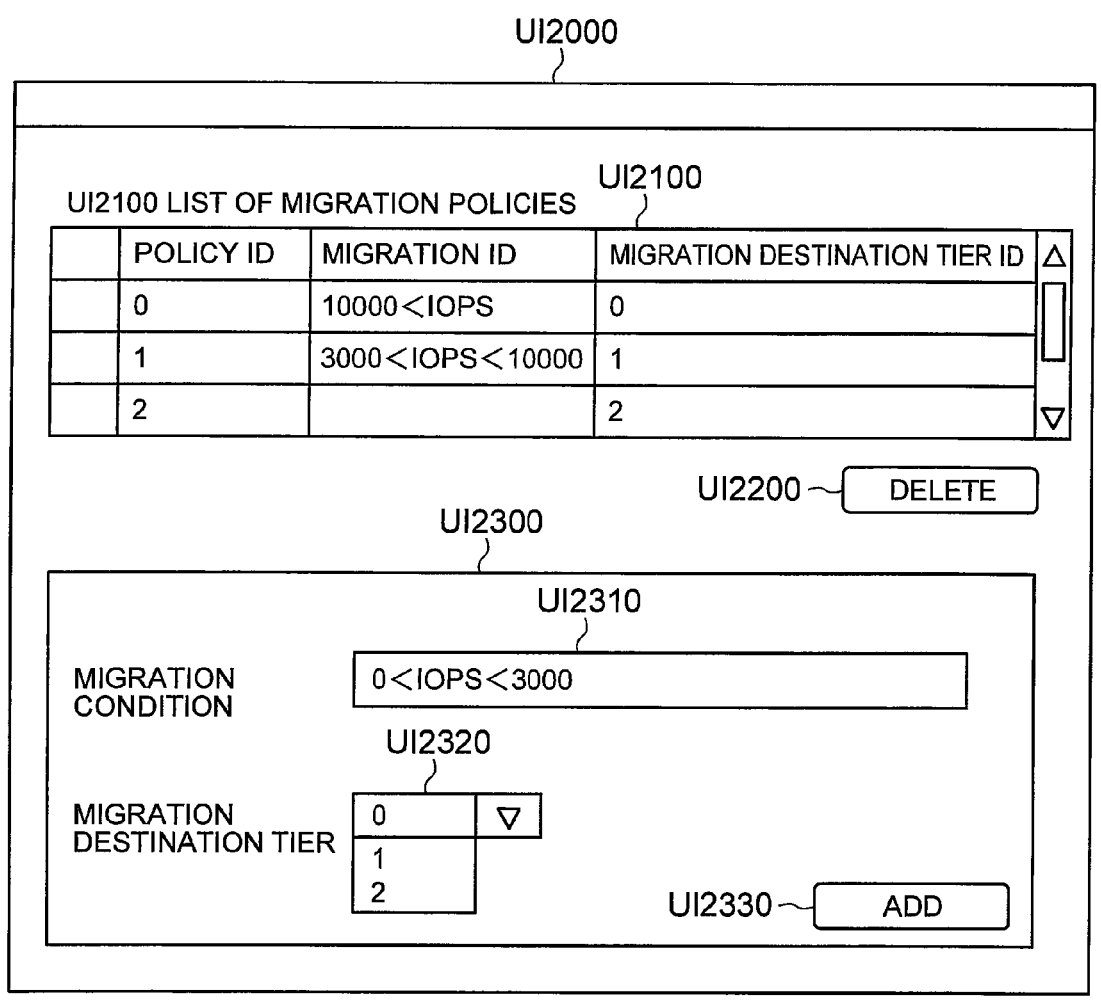
FIG. 13 is a diagram showing an example of the user interface of the migration setting program for setting the migration policy.

FIG. 13 shows a user interface UI2000 used by the user for setting the migration policy in the present example. The UI2000 includes a table UI2100 that displays a list of migration policies, a button UI2200 for deleting a migration policy, and a field UI2300 for inputting migration policies. The field UI2300 for inputting migration policies includes a text field UI2310 for inputting migration conditions, a drop down list UI2320 for selecting the storage tier of the migration destination, and a button UI2330 for adding a migration policy. The table UI2100 of the list of migration policies has check boxes so that the user can select each line of the table.

The user inputs the migration conditions in the text field UI2310. There is no particular limitation on the grammar for describing the migration conditions. Further, the user selects the storage tier of the migration destination from the drop down list UI2320, and presses the button UI2330. In this way the migration condition and the migration destination tier are added as a migration policy. To delete a migration policy, the user selects the line to be deleted from the table UI2100 of the list of migration policies, and presses the button UI2200.

Next, in step S3030, the migration setting program 4130 stores the migration policy information in the migration policy table 4150.

Next, in step S3040, the migration setting program 4130 receives the associated policy setting from the user via the user interface of the migration setting program 4130.

FIG. 14 shows a user interface UI3000 used by the user to set the associated policy in the present example. The UI3000 includes a table UI3100 that displays a list of associated policies, a button UI3200 for deleting an associated policy, and a field UI3300 for inputting associated policies. The field UI3300 for inputting associated policies includes a drop down list UI3310 for selecting the timing of the associated destination volume, a field UI3320 for inputting the condition for migrating the associated destination volume, a drop down list UI3330 for selecting the policy for migrating the associated destination volume, a table UI3340 of a list of migration policies used when selecting an existing policy ID as the policy for migrating the associated destination volume, and a button UI3350 for adding an associated policy. The table UI3100 of the list of associated policies and the table UI3340 of the list of migration policies have check boxes, so that the user can select each line of each table.

The user selects the timing for migration of the associated destination volume from the drop down list UI3310. Also, the user inputs the condition for migrating the associated destination volume using a drop down list UI3321, a drop down list UI3322, and a text field UI3323. Specifically, the user selects the applicable condition from the drop down list UI3321, selects the comparative operator for the condition from the drop down list UI3322, and enters the condition in the text field UI3323. In addition, the user selects the policy for migrating the associated destination volume from the drop down list UI3330. At this time, if "in accordance with policy ID (specified below)" is selected, a policy is selected from the table UI3340 of the list of migration policies as the migration policy of the associated destination volume. Finally, the associated policy is set by the user pressing the button UI3350. To delete an associated policy, the user selects the associated policy to be deleted from the table UI3100 of the list of associated policies, and presses the button UI3200.

Next, in step S3050, the migration setting program 4130 stores the associated policy information in the associated policy table 4160.

Next, in step S3060, the migration setting program 4130 receives the policy allocation setting from the user via the user interface of the migration setting program 4130.

FIG. 15 shows a user interface UI4000 used by the user for setting the policy allocation in the present example. The UI4000 includes a table UI4100 that displays a list of logical volumes 1110, a table UI4200 that displays a list of migration policies, a table UI4300 that displays a list of associated policies, and a button UI4400 for allocating migration policies and associated policies to logical volumes 1110. The table UI4100 that displays the list of logical volumes, the table UI4200 that displays the list of migration policies, and the table UI4300 that displays the list of associated policies have check boxes, so the user can select each line of each table.

The user selects the logical volume 1110 that is to be allocated the migration policy and the associated policy from the table UI4100 of the list of logical volumes. Also, the user selects the migration policy to be allocated to the logical volume 1110 from the table UI4200 of the list of migration policies. Also, the user selects the associated policy to be allocated to the logical volume 1110 from the table UI4300 of the list of associated policies. Finally, the user sets the allocation of the migration policy and the associated policy to the logical volume 1110 by pressing the button UI4400.

Next, in step S3070, the migration setting program 4130 stores the policy allocation setting information in the policy allocation table 4170. As a result of the above process, the setting for the migration is carried out.

FIG. 16 shows the sequence of the migration instruction process in the present example.

In the process in FIG. 16, first in step S4000, the scheduler function of the configuration management program 4110 executes the migration instruction program 4180 at fixed time intervals. The time intervals that the scheduler function of the configuration management program 4110 executes the migration instruction program may be predetermined by the configuration management program 4110, or it may be set by the user, or it may be determined by another method.

Next, in step S4010, the migration instruction program 4180 refers to the configuration information table 4120, the storage tier table 4140, the migration policy table 4150, and the policy allocation table 4170, and searches for a logical volume 1110 that satisfies the migration condition.

Next, in step S4020, the migration instruction program 4180 determines whether or not there is a logical volume 1110 that satisfies the migration condition. If there is no such a logical volume 1110, this process terminates. If there is such a logical volume 1110, the process proceeds to step S4030.

In step S4030, the migration instruction program 4180 refers to the storage tier table 4140, the configuration information table 4120, the migration policy table 4150, and the policy allocation table 4170, identifies the storage tier of the migration destination from the information on the policy allocated to the logical volume 1110 found in step S4010, and selects the migration destination logical volume 1110 from among the storage tiers. The method of selecting the logical volume of the migration destination may be, for example, selecting a logical volume 1110 from among the logical volumes 1110 included in the storage tier whose capacity is larger than the logical volume 1110 found in step S4010 and whose path flag is "none", but there is no particular limitation on the method.

Next, in step S4040, the migration instruction program 4180 instructs the migration program 1216 to carry out migration for the logical volume 1110 found in step S4010.

Next, in step S4050, the migration program 1216 executes the migration process. The migration process is described in detail later.

Next, in step S4060, the configuration management program 4110 notifies the migration instruction program 4180 of the logical volume 1110 migrated in step S4050, and requests that the migration process to be carried out for the logical volumes 1110 associated with the volume.

Next, in step S4070, the migration instruction program 4180 carries out the migration instruction process for the logical volumes 1110 (associated destination volumes) having an association with the logical volume 1110 that was migrated in step S4050.

FIG. 17 shows the sequence of the migration instruction process for the associated destination volume in the present example.

In this process, first in step S5000, the migration instruction program 4180 refers to the policy allocation table 4170, and searches for logical volumes 1110 associated with the logical volume 1110 specified from the configuration management program 4110.

Next, in step S5010, the migration instruction program 4180 determines whether or not there is such a volume. If there is no such volume, this process terminates. If there is such a volume, the procedure proceeds to step S5020.

In step S5020, the migration instruction program 4180 refers to the associated policy table 4160, and identifies the timing of migration of the logical volume 1110 found in step S5000.

Next, in step S5030, the migration instruction program 4180 determines whether or not the present time corresponds to the timing identified in step S5020. If not this process terminates. If it does, the procedure proceeds to step S5040.

In step S5040, the migration instruction program 4180 refers to the associated policy table 4160, and identifies the condition for migrating the logical volume 1110 found in step S5000.

Next, in step S5050, the migration instruction program 4180 determines whether or not the condition identified in step S5040 is satisfied. If the condition is not satisfied, this process terminates. If the condition is satisfied, the procedure proceeds to step S5060.

In step S5060, the migration instruction program 4180 refers to the associated policy table 4160, and identifies the policy (associated policy) for migrating the logical volume 1110 found in step S5000.

Next, in step S5070, the migration instruction program 4180 refers to the configuration information table 4120, the storage tier table 4140, the migration policy table 4150, and the policy allocation table 4170, and selects the migration destination logical volume 1110 of the logical volume 1110 found in step S5000. The method of selecting the migration destination logical volume may be, for example, selecting a logical volume 1110 from among the logical volumes 1110 included in the storage tier whose capacity is larger than the logical volume 1110 found in step S5000 and whose path flag is "none", but there is no particular limitation on the method. Also, if there is no migration destination logical volume, the user is notified by a method such as log output or the like.

Next, in step S5080, the migration instruction program 4180 requests the migration process to be carried out for the logical volume found in step S5000.

FIG. 18 shows the sequence of the migration process in the present example. In this process, first in step S6000, the migration program 1216 refers to the volume allocation table 1213, and sets the migration status of the logical volume 1110 specified by the migration instruction program 4180 to "migrating". In this way, from this point onwards, write I/O for this volume is controlled by the I/O control program 1212 to be directed not to the volume, but to the memory as shown in FIG. 9.

Next, in step S6010, the migration program 1216 instructs the data copy program 1215 to copy the data stored in the logical volume 1110 of the migration source to the logical volume 1110 of the migration destination.

Next, in step S6020, the data copy program 1215 copies the data stored in the migration source logical volume 1110 to the migration destination logical volume 1110.

Next, in step S6030, the migration program 1216 requests the I/O control program 1212 to temporarily stop write I/O.

Next, in step S6040, the I/O control program 1212 finishes any current write I/O, and then temporarily stops write I/O. In the present example, even when write I/O is stopped, the storage sub-system 1000 receives I/O requests (read, write) from the host computer 2000, and these I/O requests are held in the memory 1210 or cache memory, or the like.

Next, in step S6050, the migration program 1216 requests the I/O control program 1212 to write the data written to memory for the migration source logical volume 1110 to the area of the migration destination logical volume 1110.

Next, in step S6060, the I/O control program 1212 refers to the physical resource allocation table 1214, and writes all the data written in the LBA area in the memory within the volume LBA area of the migration source logical volume 1110 to the LBA area in the physical resource allocated to the migration destination logical volume 1110.

Next, in step S6070, the migration program 1216 refers to the physical resource allocation table 1214, and replaces the LUN of the migration source logical volume 1110 with the LUN of the migration destination logical volume 1110.

Next, in step S6080, the migration program 1216 requests the I/O control program 1212 to restart write I/O.

Next, in step S6090, the I/O control program 1212 restarts write I/O.

FIG. 19 shows the sequence when carrying out the data synchronization process between a pair of logical volumes 1110 having a copy pair relationship, when only the associated source volume was migrated.

When data has been written to an associated source volume, it may not be possible to immediately write data to the associated destination volume. Therefore, by carrying out migration of the associated destination volume after synchronization of the data of the associated source volume and associated destination volume, inconsistency between the data of the associated source volume and the associated destination volume does not occur, and migration can be carried out. In the process in FIG. 19, first in step S7000, the migration program 1216 executes the migration process for an associated source volume to which an associated policy ID is allocated in which the timing in the associated policy table 4160 is "after synchronization".

Next, in step S7010, the configuration management program 4110 receives an instruction from the user via the user interface of the configuration management program 4110 to execute the process to synchronize the data between logical volumes 1110 having a copy pair relationship.

FIG. 20 shows a user interface UI5000 used by the user for executing the synchronization process for the data in logical volumes 1110 having a copy pair relationship in the present example. The user interface UI5000 includes a table UI5100 that displays a list of logical volumes 1110 having a copy pair relationship, and a button UI5200 for synchronizing the data in logical volumes 1110 having a copy pair relationship. The table with the list of logical volumes 1110 having a copy pair relationship has check boxes, so that the user can select each line.

The user selects the pair whose data is to be synchronized from the table UI5100 of the list of logical volumes 1110 having a copy pair relationship, and presses the button UI5200. In this way, the data is synchronized between the pair.

Next, in step S7020, the configuration management program 4110 requests the data copy program 1215 to synchronize the data in the pair of volumes.

Next, in step S7030, the data copy program 1215 synchronizes the data in the pair of volumes. This process is carried out by writing the data written in the copy source logical volume 1110 that has not been reflected in the copy destination logical volume 1110 to the copy destination logical volume 1110.

Next, in step S7040, the configuration management program 4110 notifies the migration instruction program 4180 of the logical volume 1110 for which synchronization of data was executed in step S7030, and requests that the migration instruction process be carried out for the logical volume 1110 associated with the volume.

Next, in step S7050, the migration instruction program 4180 carries out the migration instruction process for the logical volume 1110 (associated destination volume) having the association with the logical volume 1110 for which synchronization was executed in step S7030.

Figure 21:
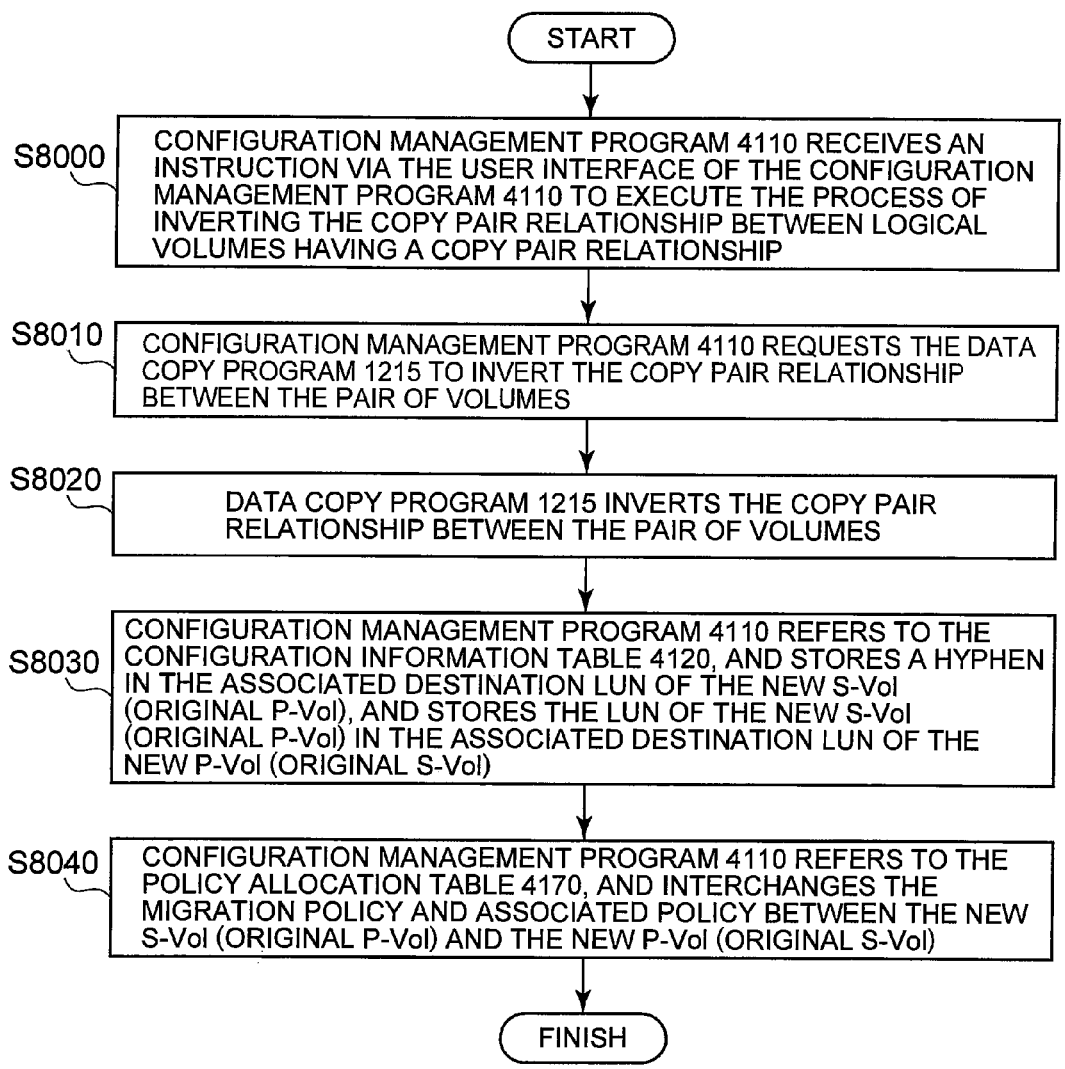
FIG. 21 is a diagram showing an example of the copy pair inversion process.

FIG. 21 shows the sequence of the process when inverting the copy pair relationship between logical volumes 1110 having a copy pair relationship. Here, inverting a copy pair is the process of making the copy source logical volume 1110 the copy destination, and making the copy destination logical volume 1110 the copy source.

In this process, first in step S8000, the configuration management program 4110 receives an instruction from the user via the user interface of the configuration management program 4110 to execute the process of inverting the copy pair relationship between logical volumes having a copy pair relationship.

Next, in step S8010, the configuration management program 4110 requests the data copy program 1215 to invert the copy pair relationship between the pair of volumes.

Next, in step S8020, the data copy program 1215 inverts the copy pair relationship between the pair of volumes.

Next, in step S8030, the configuration management program 4110 refers to the configuration information table 4120, and stores a hyphen in the associated destination LUN of the logical volume 1110 that has become the new copy destination (hereafter referred to as the original P-Vol). Also, the configuration management program 4110 stores the LUN of the original P-Vol in the associated destination LUN of the logical volume 1110 that has become the new copy source (hereafter referred to as the original S-Vol).

Next, in step S8040, the configuration management program 4110 refers to the policy allocation table 4170, and interchanges the migration policy and associated policy between the original P-Vol and the original S-Vol.

The above was an explanation of the data processing procedure in the first example. Using these processes, after migration, data copying, or other processes have been carried out for an arbitrary logical volume 1110, it is possible to carry out the migration process for a logical volume 1110 having an association to that volume. As a result, it is possible to control the migration in accordance with the user's requirements for a pair (or a group) of logical volumes having an association. Also, using the process shown in FIG. 21, it is possible to appropriately control the migration of the pair (or group), even when the association between the logical volumes 1110 has changed, by interchanging the policies.

B. SECOND EXAMPLE

<<B1. System Configuration>>

Figure 22:
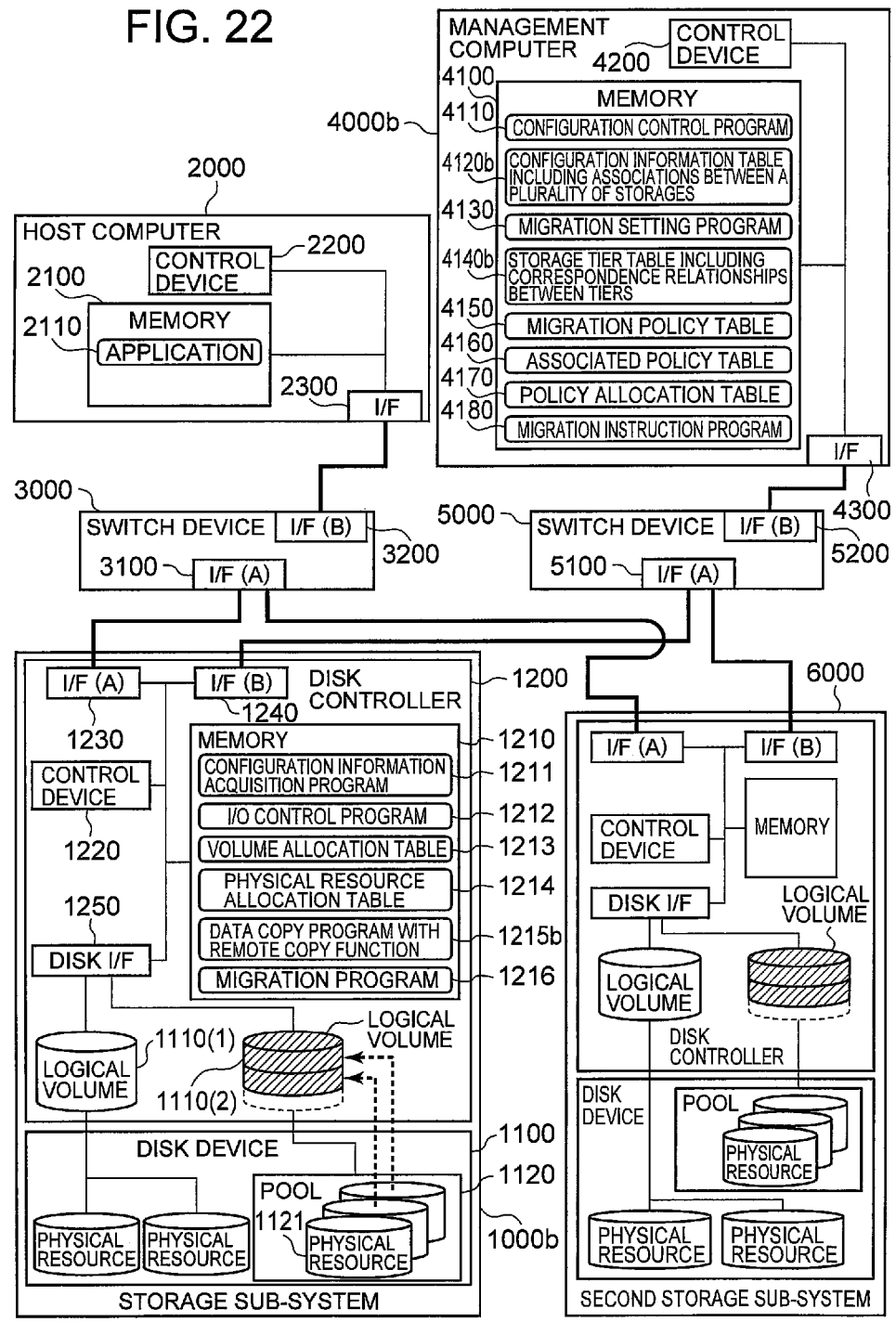
FIG. 22 is a diagram showing the system configuration in a second example.

FIG. 22 is an explanatory diagram showing the configuration of the data processing system as an example of the present invention. The data processing system includes a storage sub-system 1000b, a host computer 2000, a switch device 3000, a management computer 4000b, a switch device 5000, and a second storage sub-system 6000. The figure shows one each of the storage sub-system 1000b, the host computer 2000, the switch device 3000, the management computer 4000b, the switch device 5000, and the second storage sub-system 6000, but this is not a limitation, and one or more of each may be used. Most of the present configuration is the same as the first example, so in the following only the differences are explained.

The differences from the data processing system shown in FIG. 1 are the storage sub-system 1000b having a data copy program 1215b which has a remote copying function, the management computer 4000b having a configuration information table 4120b that includes associations between a plurality of storages, and a storage tier table 4140b that includes correspondence relationships between tiers, and there being the second storage sub-system 6000. The configuration of the second storage sub-system 6000 is the same as that of the storage sub-system 1000, so its explanation is omitted.

The data copy program 1215b having the remote copying function is a program that copies data from a logical volume 1110 in the storage sub-system 1000b to a logical volume 1110 in the second storage sub-system 6000. Data can be copied by this program by transferring the data via an I/F(A) 1230 of the storage sub-system 1000b, an I/F(A) 3100 of the switch device 3000, and an I/F(A) 1230 of the second storage sub-system 6000.

The difference between the configuration information table 4120 shown in FIG. 3 and the configuration information table 4120b shown in FIG. 23 including associations between a plurality of storages is that the configuration information table 4120b that includes associations between a plurality of storages has an associated destination storage sub-system ID 4120b6. The associated destination storage sub-system ID 4120b6 is information for identifying the storage sub-system 1000b or the second storage sub-system 6000 that has the logical volume 1110 associated with a certain logical volume 1110. In the first example, the associated destination logical volume 1110 was uniquely identified by the associated destination LUN 41206. However, in the present example, the associated destination logical volume 1110 is uniquely identified by the combination of the associated destination storage sub-system ID 4120b6 and the associated destination LUN 41206.

The difference between the storage tier table 4140 shown in FIG. 4 and the storage tier table 4140b that includes correspondence relationships between tiers shown in FIG. 24 is the storage tier table 4140b that includes correspondence relationships between tiers includes a second storage sub-system ID 41403*b* and a second LUN 41404*b*. The second storage sub-system ID 41403*b* and the second LUN 41404*b* are information for identifying the logical volumes 1110 of the second storage sub-system 6000.

As in the remote copy relationship, when a logical volume 1110 has relationships extending across a plurality of storage sub-systems, there is no guarantee that the storage sub-system 1000*b* and the second storage sub-system 6000 have exactly the same configuration. For example, if the storage sub-system 1000*b* has SSD (solid state drive) as the physical resource 1121, there is a possibility that the second storage system 6000 does not have SSD. Therefore, if for example the associated source volume is a logical volume 1110 in the storage sub-system 1000*b* and the associated destination volume is a logical volume 1110 in the second storage sub-system 6000, there is the possibility that even if the associated policy is set to "in accordance with the associated source volume", it will not be possible to set in accordance with the associated source volume.

Therefore the storage tier table 4140*b* that includes correspondence relationships between tiers includes information on the correspondence relationship between the storage tier in the storage sub-system 1000*b* and the storage tier in the second storage sub-system 6000. When the associated source volume is a logical volume 1110 in the storage sub-system 1000*b* and the associated destination volume is a logical volume 1110 in the second storage sub-system 6000, when "in accordance with the -associated source volume" is set as the associated policy, the migration destination of the associated source volume is selected from the storage tier of the storage sub-system 1000*b*, and the migration destination of the associated destination volume is selected from the storage tier of the second storage sub-system 6000.

<<B2. Explanation of the Data Processing Procedure>>

The operation of most of the present example is the same as that of the first example, so in the following the differences only are explained. The sequence of the process in the first example and the sequence of the process in the present example are different in respect of the process of migration of the associated destination volume.

Figure 25:
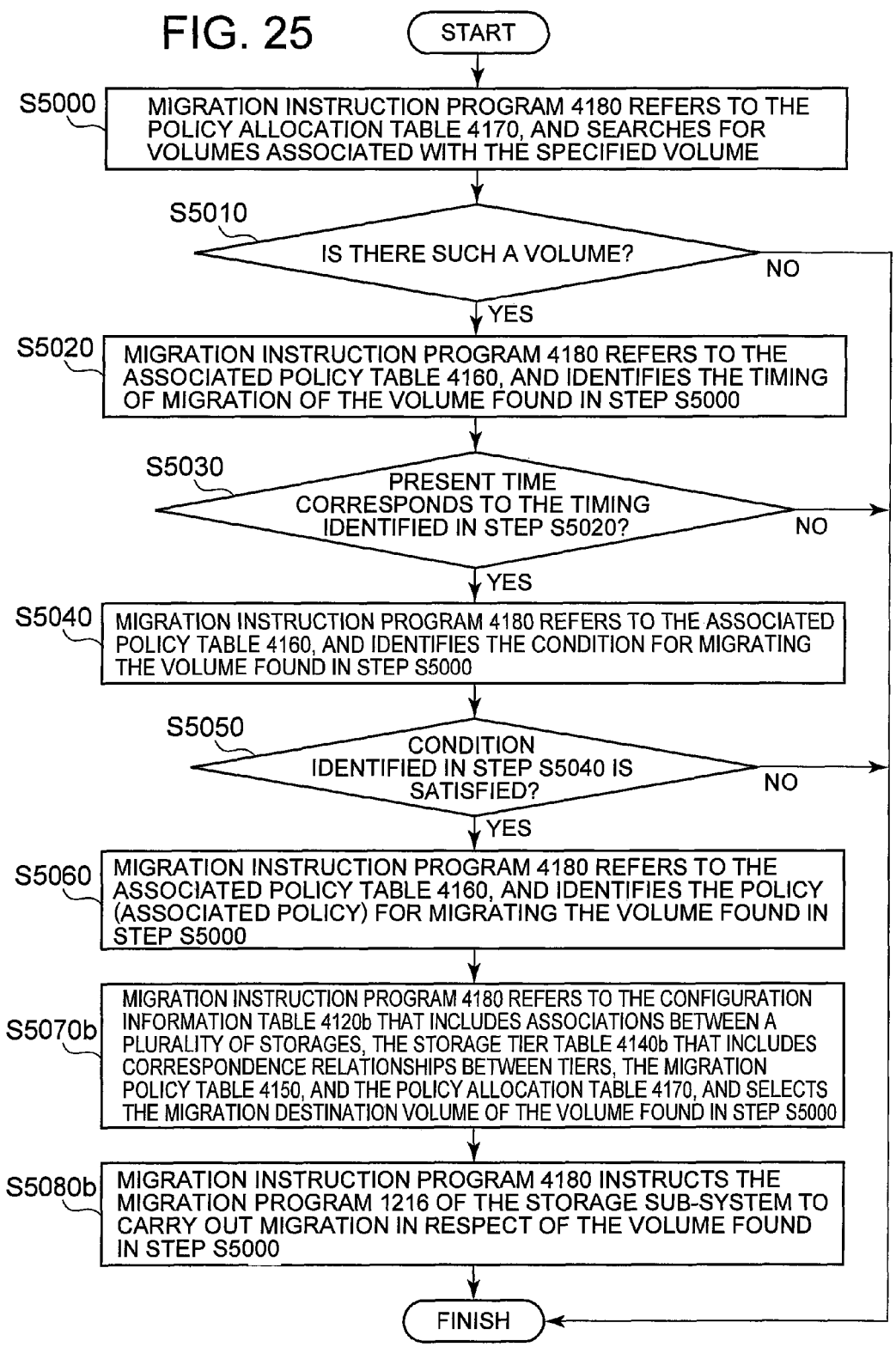
FIG. 25 is a diagram showing an example of the migration instruction process for an associated destination volume in the second example.

FIG. 25 shows the sequence of the migration process of the associated destination volume in the present example. Steps S5000, S5010, S5020, S5030, S5040, S5050, and S5060 in FIG. 25 are the same as steps S5000, S5010, S5020, S5030, S5040, S5050, and S5060 in FIG. 17, so explanation of these steps is omitted.

In the migration process of the associated destination volume in the present example, in step S5070*b*, the migration instruction program 4180 refers to the configuration information table 4120*b* that includes associations between a plurality of storages, the storage tier table 4140*b* that includes correspondence relationships between tiers, the migration policy table 4150, and the policy allocation table 4170, and selects the logical volume 1110 of the migration destination of the logical volume 1110 found in step S5000. At this time, if the logical volume 1110 found in step S5000 is a logical volume 1110 of the storage sub-system 1000*b*, the logical volume 1110 of the migration destination is selected from the storage tier of the storage sub-system 1000*b*. If the logical volume 1110 found in step S5000 is a logical volume 1110 of the second storage sub-system 6000, the logical volume 1110 of the migration destination is selected from the storage tier of the second storage sub-system 6000. The method of selecting the migration destination logical volume may be, for example, selecting a logical volume 1110 from among the logical volumes 1110 included in the storage tier whose capacity is larger than the logical volume 1110 found in step S5000 and whose path flag is "none", but there is no particular limitation on the method. Also, if there is no migration destination logical volume, the user is notified by a method such as log output or the like.

Next, in step S5080*b*, the migration instruction program 4180 requests that the migration process be carried out in respect of the logical volume 1110 found in step S5000. The request to carry out this process is directed to either the migration program 1216 of the storage sub-system 1000*b* having the volume, or the migration program 1216 of the second storage sub-system 6000.

The above is the procedure for data processing in the second example. As a result of these processes, it is possible to control the migration in accordance with the user's requirements of a pair (or a group) of associated logical volumes, even when the logical volume 1110 has relationships that extend across a plurality of storage sub-systems, as in the remote copying relationship.

C. THIRD EXAMPLE

<<C1. System Configuration>>

Figure 26:
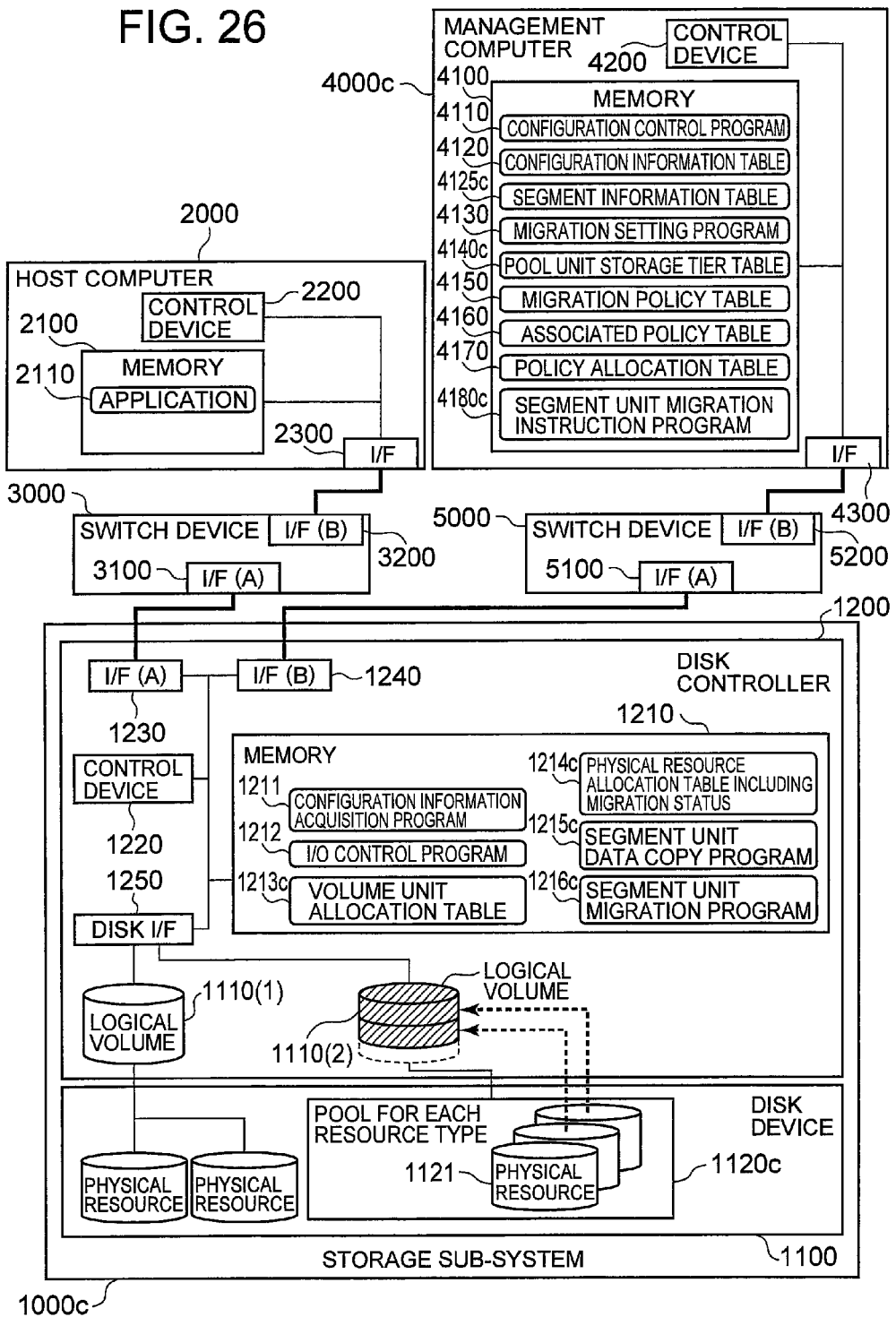
FIG. 26 is a diagram showing the system configuration in a third example.

FIG. 26 is an explanatory diagram showing the configuration of the data processing system as an example of the present invention. The data processing system includes a storage sub-system 1000*c*, a host computer 2000, a switch device 3000, a management computer 4000*c*, and a switch device 5000. The figure shows one each of the storage sub-system 1000*c*, the host computer 2000, the switch device 3000, the management computer 4000*c*, and the switch device 5000, but this is not a limitation, and one or more of each may be used. Most of the present configuration is the same as the first example, so in the following only the differences are explained.

The differences from the data processing system shown in FIG. 1 are the storage sub-system 1000*c* includes a pool 1120*c* for each resource type, a volume unit allocation table 1213*c*, a physical resource allocation table 1214*c* that includes the migration status, a segment unit data copy program 1215*c*, a segment unit migration program 1216*c*, and the management computer 4000*c* includes a segment information table 4125*c*, a pool unit storage tier table 4140*c*, and a segment unit migration instruction program 4180*c*. Here, a segment is a unit of logical storage area from which volumes are constituted, so naturally the sizes of segments are smaller than the sizes of volumes.

The pool 1120*c* for each resource type is a pool in which physical resources 1121 are grouped according to type.

The difference between the volume allocation table 1213 shown in FIG. 2 and the volume unit allocation table 1213*c* shown in FIG. 27 is that 12123*c*, which indicates the migration status, is "migrating" if even one segment in the volume is being migrated, and is a hyphen if none of the segments in the volume are being migrated. However, the information stored in the migration status 12123*c* and its method of expression are not limited to this. Other information indicating the migration status of the segments in the volume and other methods of expression may be used. Also, 12123*c* which displays the migration status does not have to be in the volume allocation table 1213*c*.

The difference between the physical resource allocation table 1214 shown in FIG. 3 and the physical resource allocation table 1214*c* that includes the migration status shown in FIG. 28 is that the physical resource allocation table 1214*c* that includes the migration status has a segment unit migration status 12135*c*.

The segment unit data copy program 1215c is a program having the function of copying data in segment units between logical volumes 1110.

The segment unit migration program 1216c is a program having the function of migrating segment units between logical volumes 1110.

The segment information table 4125c is a table that stores information on the segments that constitute the logical volumes 1110 of the storage sub-system 1000c. As shown in FIG. 29, this table includes a storage sub-system ID 41250, a LUN 41251, a segment ID 41252, a resource type 41253, and an IOPS 41254. The information stored in the segment information table 4125c is not limited to this, and other information may also be stored.

The difference between the storage tier table 4140 shown in FIG. 4 and the pool unit storage tier table 4140c shown in FIG. 30 is that the pool unit storage tier table 4140c includes a pool ID 41402c, a free capacity 41403c, and a resource type 41404c.

The segment unit migration instruction program 4180c is a program that instructs migration in units of the segments that constitute the logical volumes 1110 of the storage sub-system 1000c.

<<C2. Explanation of the Data Processing Procedure>>

The operation of most of the present example is the same as that of the first example, so in the following the differences only are explained. The difference from the sequence of the process in the first example is that in the sequence of the process in the present example, the migration process is carried out in segment units.

Figure 31:
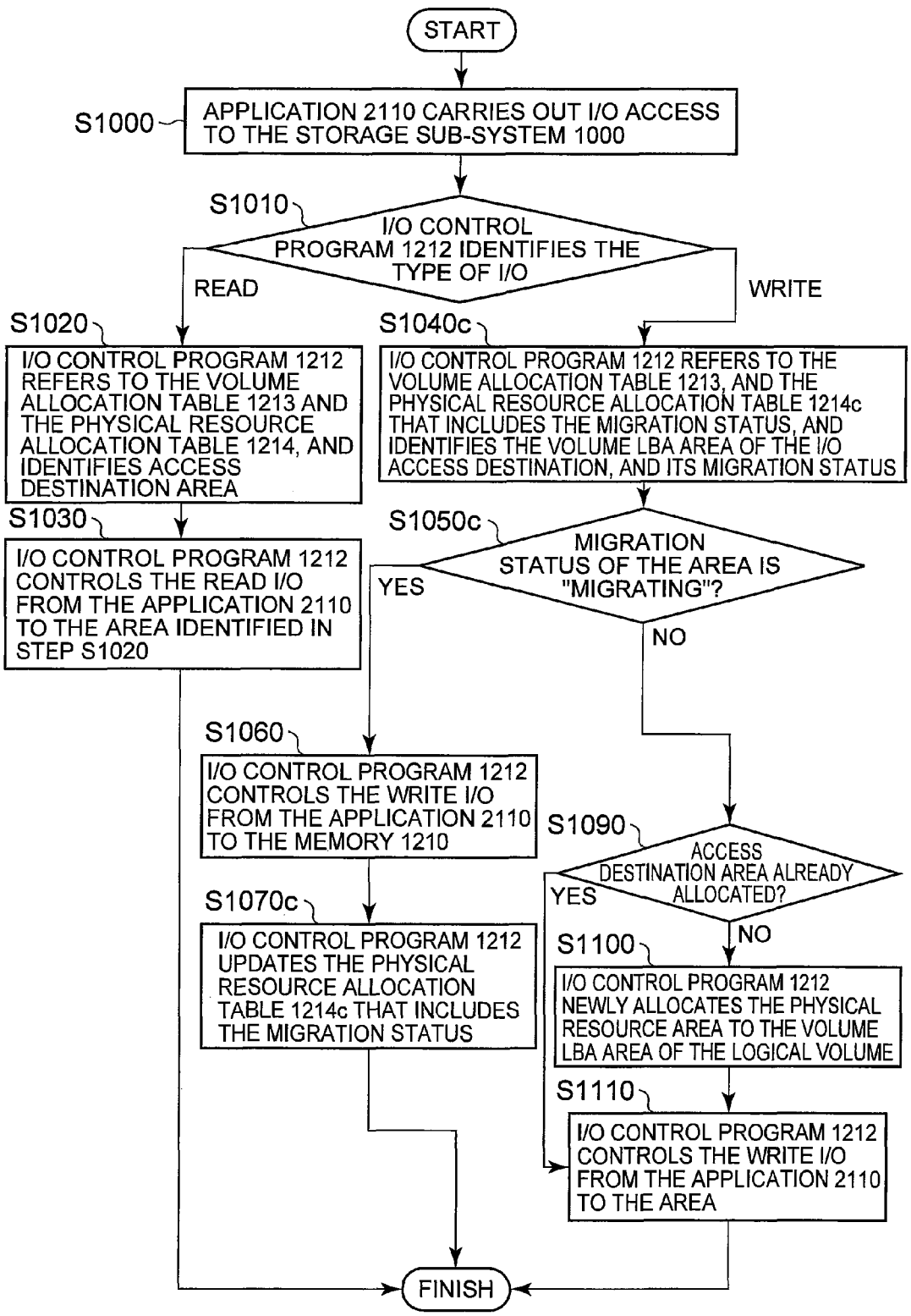
FIG. 31 is a diagram showing an example of the segment unit I/O control process.

FIG. 31 shows the sequence of the segment unit I/O control process in the present example. The steps S1000, S1010, S1020, S1030, S1060, S1090, S1100, and S1110 in this process are the same as steps S1000, S1010, S1020, S1030, S1060, S1090, S1100, and S1110 in the I/O control process shown in FIG. 9, so their explanation is omitted.

In this process, in step S1040c, the I/O control program 1212 refers to the volume allocation table 1213, and the physical resource allocation table 1214c that includes the migration status, and identifies the volume LBA area of the I/O access destination, and its migration status.

Next, in step S1050c, the I/O control program 1212 determines whether or not the migration status of the volume LBA area is "migrating". If the migration status is "migrating", the procedure proceeds to step S6060. If the migration status is not "migrating", the procedure proceeds to step S1090.

In step S1070c, the I/O control program 1212 updates the physical resource allocation table 1214c that includes the migration status, and sets the physical resource ID corresponding to the volume LBA area 12132 that was the subject of the write access as the identifier of the memory 1210, and sets the LBA area 12134 as the storage area identifier of the memory 1210.

Figure 32:
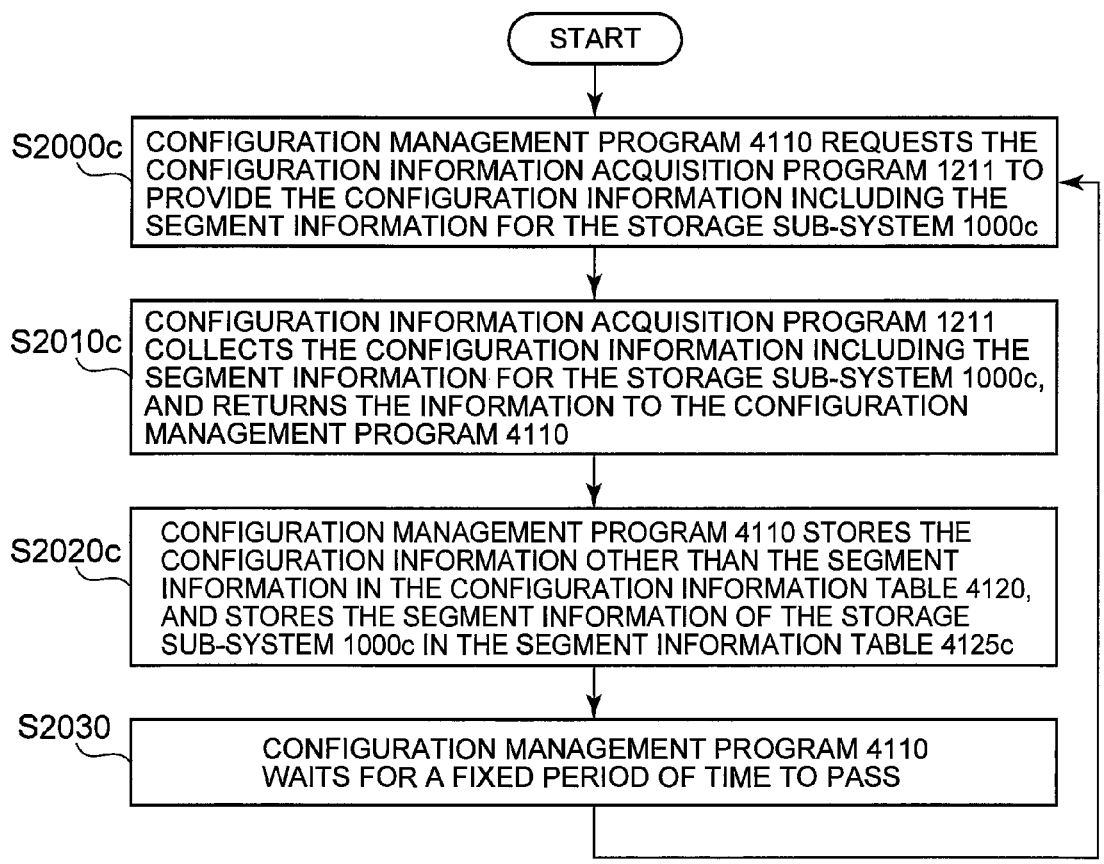
FIG. 32 is a diagram showing an example of the process of acquiring configuration information including segment information.

FIG. 32 shows the sequence of the process when acquiring the configuration information including the segment information of the storage sub-system 1000c. Step S2030 in this process is the same as the configuration information acquisition process step S2030 shown in FIG. 10, so its explanation is omitted.

In this process, first instep S2000c, the configuration management program 4110 requests the configuration information acquisition program 1211 to provide the configuration information including the segment information for the storage sub-system 1000c.

Next, in step S2010c, the configuration information acquisition program 1211 acquires the configuration information including the segment information for the storage sub-system 1000c, and returns the information to the configuration management program 4110.

Next, in step S2020c, the configuration management program 4110 stores the segment information of the storage sub-system 1000c in the segment information table 4125c, and stores the configuration information other than the segment information in the configuration information table 4120.

Figure 33:
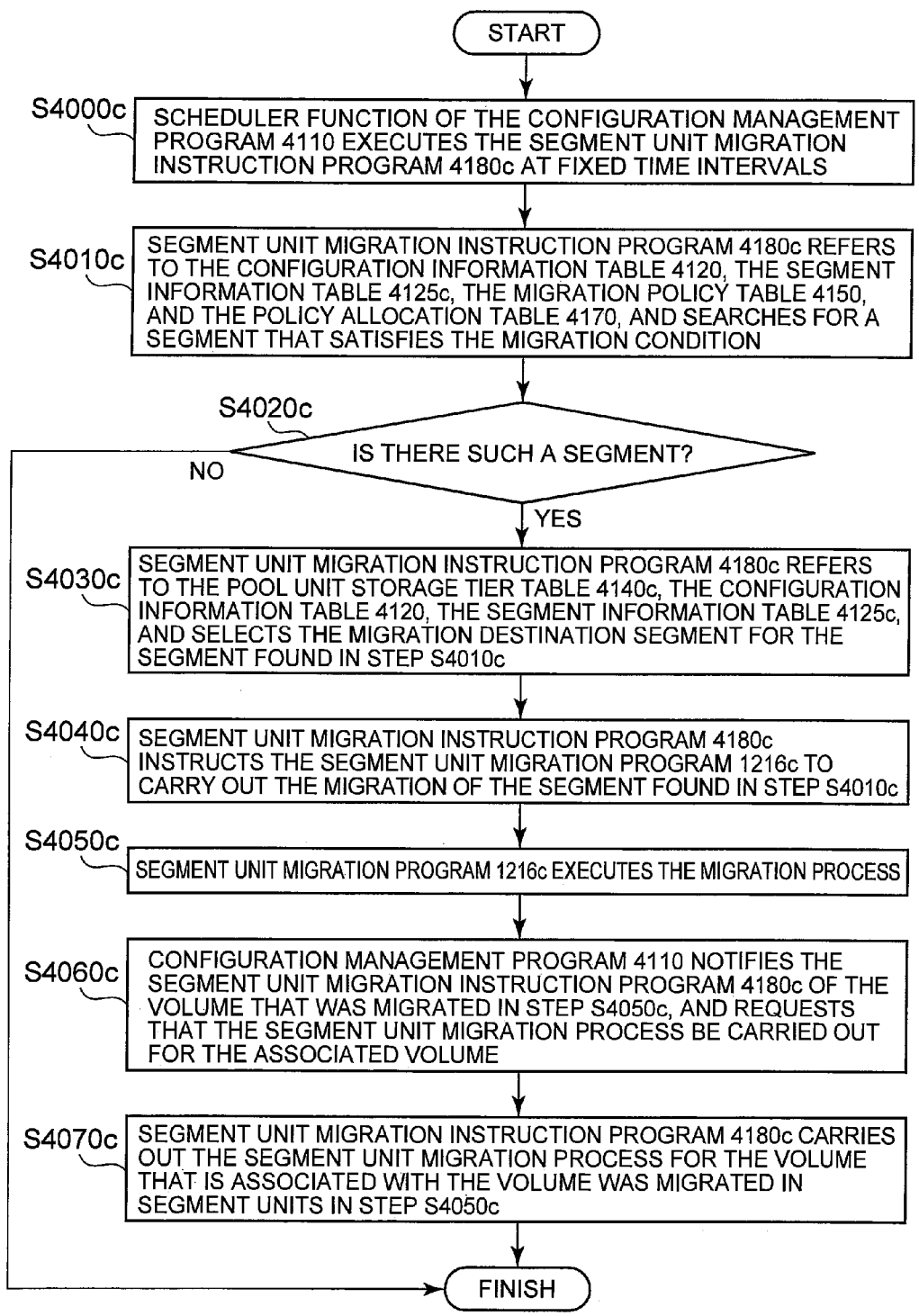
FIG. 33 is a diagram showing an example of the segment unit migration instruction process.

FIG. 33 shows the sequence of the segment unit migration instruction process in the present example.

In this process, first in step S4000c, the scheduler function of the configuration management program 4110 executes the segment unit migration instruction program 4180c at fixed time intervals. The time intervals that the scheduler function of the configuration management program 4110 executes the segment unit migration instruction program may be predetermined by the configuration management program 4110, or it may be set by the user, or it may be determined by another method.

Next, in step S4010c, the segment unit migration instruction program 4180c refers to the configuration information table 4120, the segment information table 4125c, the migration policy table 4150, and the policy allocation table 4170, and searches for a segment that satisfies the migration condition.

Next, in step S4020c, the segment unit migration instruction program 4180c determines whether or not there is a segment that satisfies the migration condition. If there is no such segment, this process is terminated. If there is such a segment, the procedure proceeds to step S4030c.

In step S4030c, the segment unit migration instruction program 4180c refers to the pool unit storage tier table 4140c, the configuration information table 4120, the segment information table 4125c, the migration policy table 4150, and the policy allocation table 4170, identifies the migration destination storage tier from the policy information allocated to the logical volume 1110 that contains the segment that was found in step S4010c, and selects the migration destination pool 1120c from within the storage tier. The method of selecting the migration destination pool may be, for example, the method of selecting a pool from among the pools 1120c included in the storage tier with a free capacity larger than the segment found in step S4010, but this is not particularly a limitation. Also, if there is not even one migration destination pool 1120c, the user is notified by a method such as the log output or the like.

Next, in step S4040c, the segment unit migration instruction program 4180c instructs the segment unit migration program 1216c to carry out the migration of the segment found in step S4010c.

Next, in step S4050c, the segment unit migration program 1216c executes the migration process. The segment unit migration process is described in detail later.

Next, in step S4060c, the configuration management program 4110 notifies the segment unit migration instruction program 4180c of the logical volume 1110 that contains the segment that was migrated in step S4050c, and requests that the segment unit migration process be carried out for the logical volume 1110 associated with the volume.

Next, in step S4070c, the segment unit migration instruction program 4180c carries out the segment unit migration process for the logical volume 1110 that is associated with the logical volume 1110 that contains the segment that was migrated in step S4050c.

Figure 34:
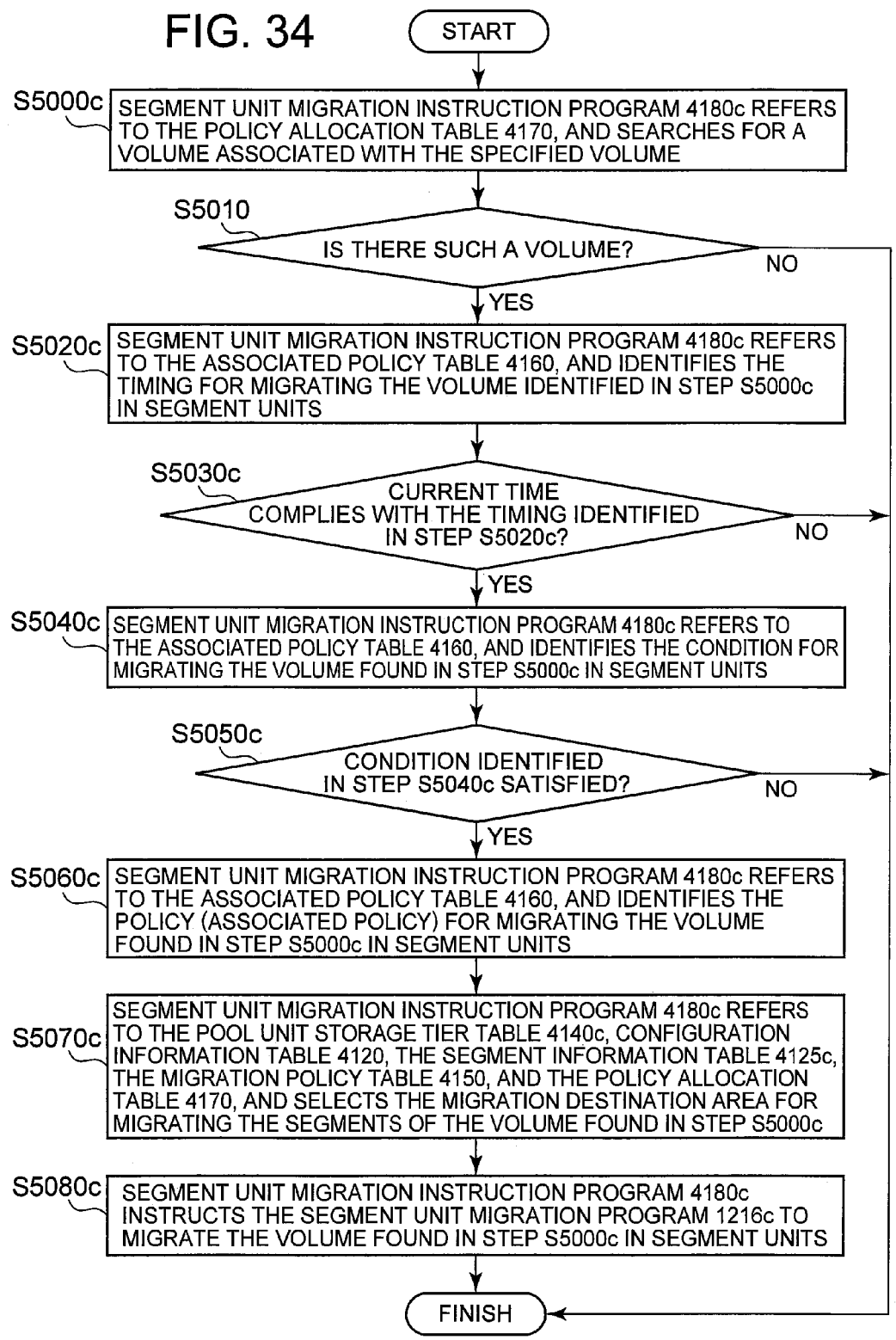
FIG. 34 is a diagram showing an example of the segment unit migration instruction process for associated destination volumes.

FIG. 34 shows the sequence when carrying out the segment unit migration process for an associated destination volume in the present example.

In this process, first in step S5000c, the segment unit migration instruction program 4180c refers to the policy allocation table 4170, and searches for a logical volume 1110 associated with the logical volume 1110 specified from the configuration management program 4110.

Next, in step S5010c, the segment unit migration instruction program 4180c determines whether or not there is such a volume. If there is no such volume, this process is terminated. If there is such a volume, the procedure proceeds to step S5020c.

In step S5020c, the segment unit migration instruction program 4180c refers to the associated policy table 4160, and identifies the timing for migrating the logical volume 1110 identified in step S5000c in segment units.

Next, in step S5030c, the segment unit migration instruction program 4180c determines whether or not the current time complies with the timing identified in step S5020c. If the current time does not comply, this process terminates. If it does comply, the procedure proceeds to step S5040c.

In step S5040c, the segment unit migration instruction program 4180c refers to the associated policy table 4160, and identifies the condition for migrating the logical volume 1110 found in step S5000c in segment units.

Next, in step S5050c, the segment unit migration instruction program 4180c determines whether or not the condition identified in step S5040c is satisfied. If the condition is not satisfied this process terminates. If the condition is satisfied the procedure proceeds to step S5060c.

In step S5060c, the segment unit migration instruction program 4180c refers to the associated policy table 4160, and identifies the policy (associated policy) for migrating the logical volume 1110 found in step S5000c in segment units.

Next, in step S5070c, the segment unit migration instruction program 4180c refers to the configuration information table 4120, the segment information table 4125c, the pool unit storage tier table 4140c, the migration policy table 4150, and the policy allocation table 4170, and selects the migration destination pool 1120c for migrating the segments of the logical volume 1110 found in step S5000c. Further, the segment unit migration instruction program 4180c selects a free area from within the physical resource 1121 included in the selected pool 1120c. The method of selecting the migration destination pool 1120c may be, for example, the method of selecting a pool from among the pools 1120c included in the storage tier with free capacity larger than the segment found in step S4010, or another method, but there is no particular limitation on the method. Also, if there is no migration destination pool 1120c or free area within the pool, the user is notified by a method such as the log output or the like.

Next, in step S5080c, the segment unit migration instruction program 4180c requests that the segment unit migration process be carried out for the logical volume 1110 found in step S5000c. As stated previously, in the present example, the segments in the associated volume, the segment corresponding to the segment of the logical volume 1110 that was the subject of the process in step S4020 is migrated.

Figure 35:
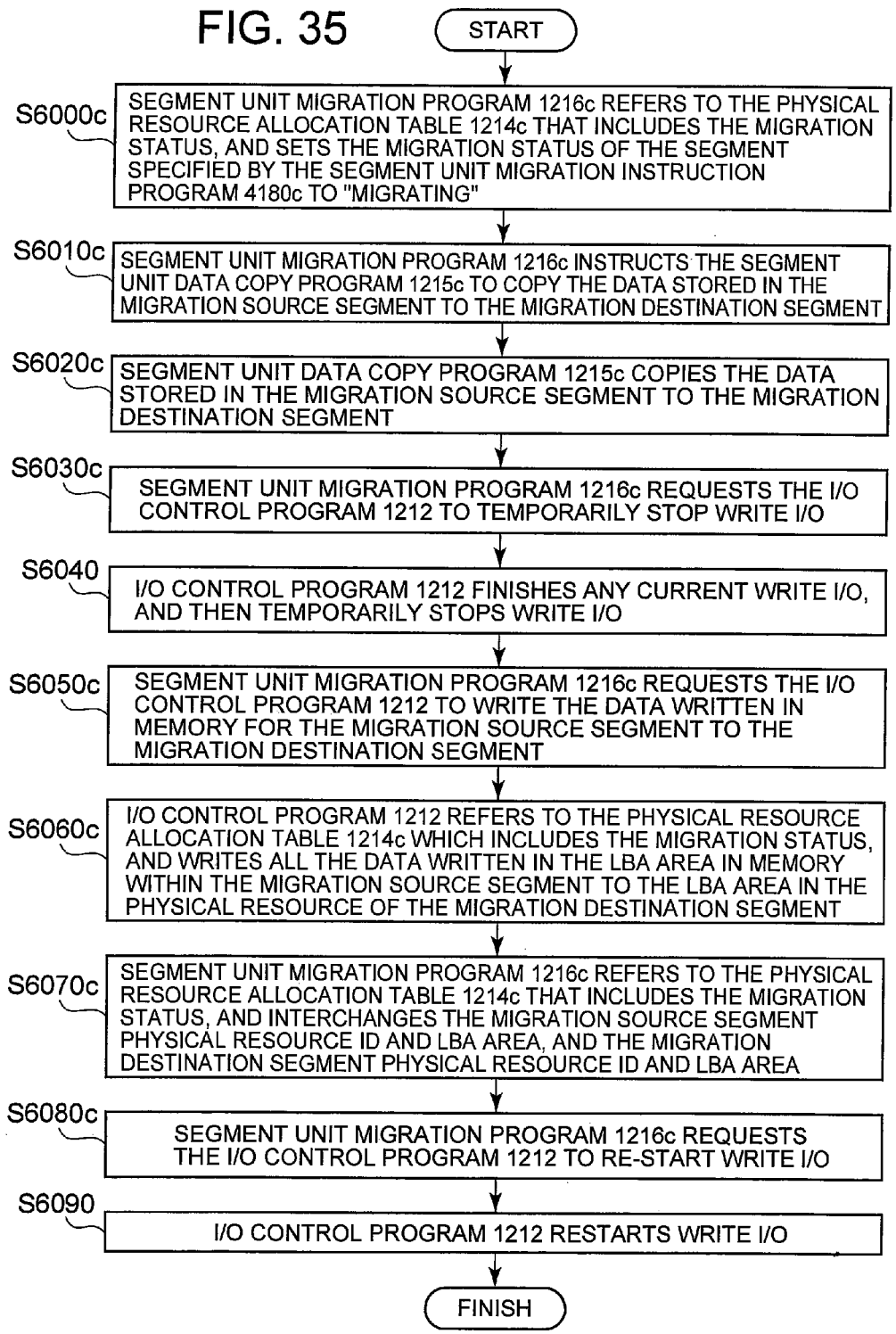
FIG. 35 is a diagram showing an example of the segment unit migration process.

FIG. 35 shows the sequence of the segment unit migration process in the present example. Steps S6040 and S6090 of this process are the same as step S6040 and S6090 of the migration process shown in FIG. 18, so their explanation is omitted.

In this process, first in step S6000c, the segment unit migration program 1216c refers to the physical resource allocation table 1214c that includes the migration status, and sets the migration status of the segment specified by the segment unit migration instruction program 4180c to "migrating". In this way, as shown in FIG. 31, from this time onwards write I/O for the segment is controlled by the I/O control program 1212 so that it is not directed to the segment, but to memory.

Next, in step S6010c, the segment unit migration program 1216c instructs the segment unit data copy program 1215c to copy the data stored in the migration source segment to the migration destination segment.

Next, in step S6020c, the segment unit data copy program 1215c copies the data stored in the migration source segment to the migration destination segment.

Next, in step S6030c, the segment unit migration program 1216c requests the I/O control program 1212 to temporarily stop write I/O.

In step S6050c, the segment unit migration program 1216c requests the I/O control program 1212 to write the data written in memory for the migration source segment to the migration destination segment.

Next, in step S6060c, the I/O control program 1212 refers to the physical resource allocation table 1214c including the migration status, and writes all the data written in the LBA area in memory within the migration source segment to the LBA area in the physical resource allocated to the migration destination segment.

Next, in step S6070c, the segment unit migration program 1216c refers to the physical resource allocation table 1214c that includes the migration status, and interchanges the migration source segment physical resource ID and LBA area, and the migration destination segment physical resource ID and LBA area.

Next, in step S6080c, the segment unit migration program 1216c requests the I/O control program 1212 to re-start write I/O.

The above is the data processing procedure in the third example. Using these processes it is possible to control the migration in accordance with the user's requirements of a pair (or group) of associated volumes in the storage sub-system 1000c having the segment unit migration function.

D. FOURTH EXAMPLE

<<D1. System Configuration>>

Figure 36:
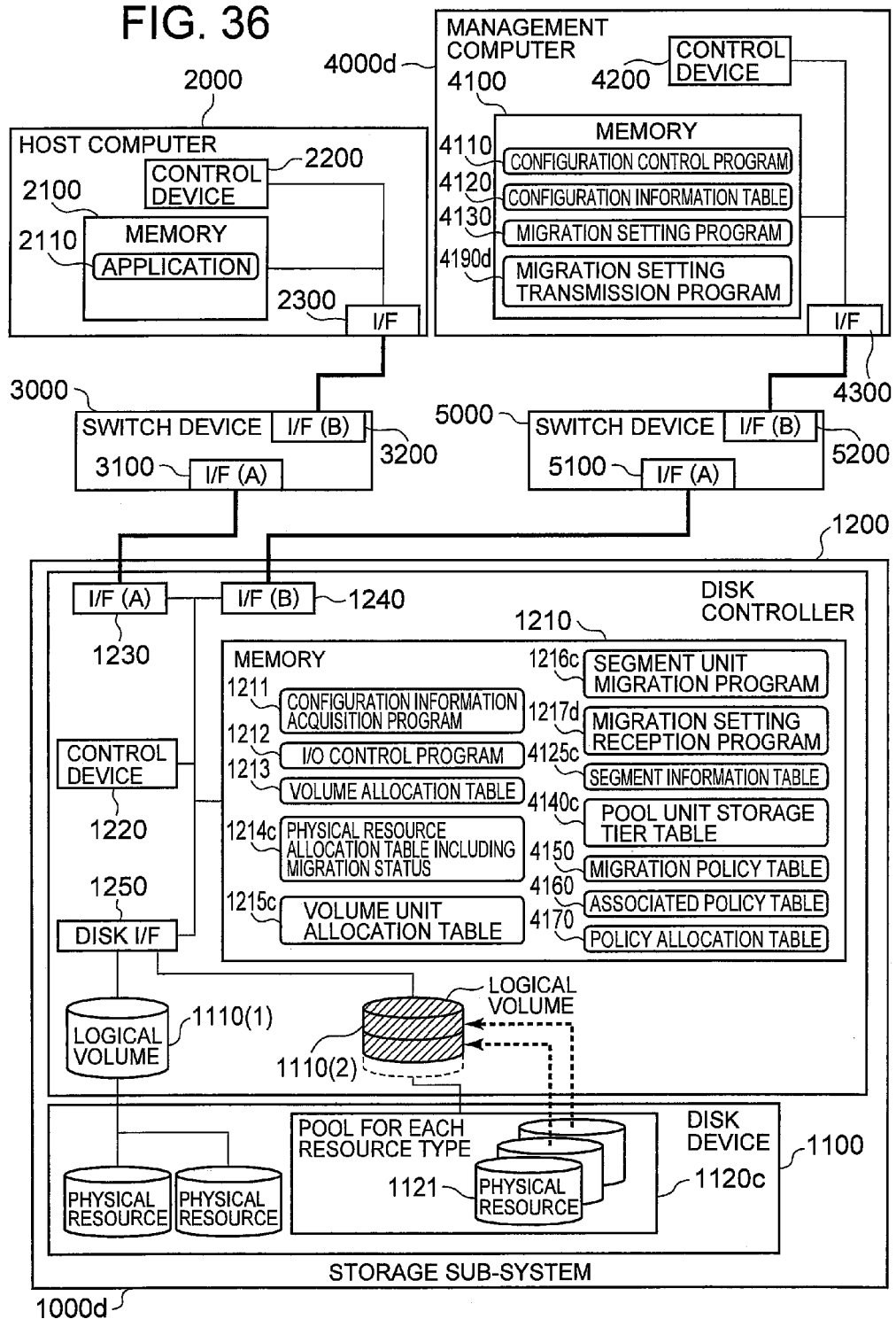
FIG. 36 is a diagram showing the system configuration in a fourth example.

FIG. 36 is an explanatory diagram showing the configuration of the data processing system as an example of the present invention. The data processing system includes a storage sub-system 1000d, a host computer 2000, a switch device 3000, a management computer 4000d, and a switch device 5000. In the figure, there is one each of the storage sub-system 1000d, the host computer 2000, the switch device 3000, the management computer 4000d, and the switch device 5000, but this is not a limitation, and there may be one or more of each. Most of the present configuration is the same as that of the third example, so in the following the differences only are explained.

The differences from the data processing system shown in FIG. 26 are the storage sub-system 1000d includes a migration setting reception program 1217d, a segment information table 4125c, a pool unit storage tier table 4140c, a migration policy table 4150, an associated policy table 4160, and a policy allocation table 4170, and the management computer 4000d does not include a segment information table 4125c, a pool unit storage tier table 4140c, a migration policy table 4150, an associated policy table 4160, and a policy allocation table 4170, and the management computer 4000d includes a migration setting transmission program 4190d.

The migration setting reception program 1217*d* is a program that receives setting information for migration transmitted from the migration setting transmission program 4190*d*.

The migration setting transmission program 4190*d* is a program that transmits to the migration setting reception program 1217*d*, the migration policy, the associated policy, and policy allocation information input by the user via the user interface of the migration setting program 4130.

The segment information table 4125*c*, the pool unit storage tier table 4140*c*, the migration policy table 4150, the associated policy table 4160, and the policy allocation table 4170 are the same as the tables in the management computer 4000*c* in the third example. The fourth example differs in that these tables are held by the storage sub-system 1000*d*.

<<D2. Explanation of the Data Processing Procedure>>

Most of the operation of the present example is the same as that of the third example, so in the following only the differences are explained. The sequence of processes in the present example differs from the sequence of processes in the third example in that the migration process for the segment of the logical volume 1110 and the migration process of the segment of the logical volume 1110 associated with this volume are carried out by a program within the storage sub-system 1000*d*, and the policy setting information necessary for this process is transmitted by the management computer 4000*d* to the storage sub-system 1000*d*.

Figure 37:
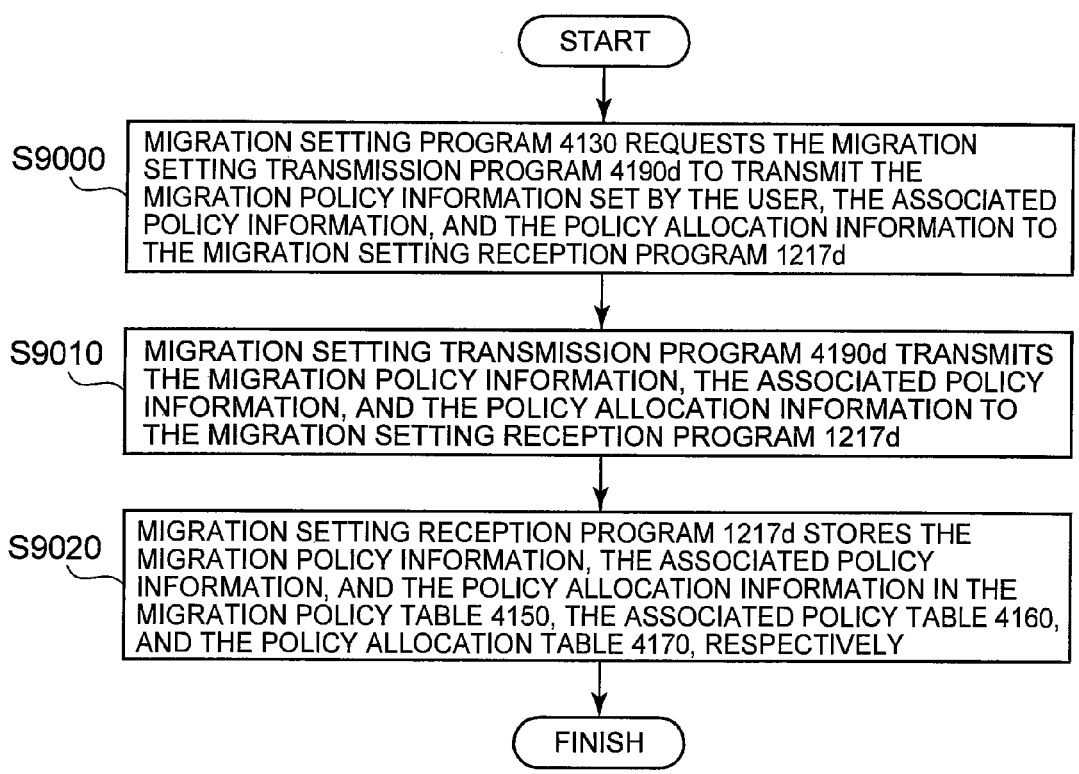
FIG. 37 is a diagram showing an example of the migration policy, associated policy, and policy allocation information transmission and reception process.

FIG. 37 shows the sequence of the process of transmitting the migration policy, the associated policy, and the policy allocation information from the management computer 4000*d* to the storage sub-system 1000*d*.

In this process, first in step S9000, the migration setting program 4130 requests the migration setting transmission program 4190*d* to transmit the migration policy information set by the user, the associated policy information, and the policy allocation information to the migration setting reception program 1217*d*.

Next, in step S9010, the migration setting transmission program 4190*d* transmits the migration policy information, the associated policy information, and the policy allocation information to the migration setting reception program 1217*d*.

Next, in step S9020, the migration setting reception program 1217*d* stores the migration policy information, the associated policy information, and the policy allocation information in the migration policy table 4150, the associated policy table 4160, and the policy allocation table 4170, respectively.

The content of the processes by the other programs is the same as in the third example, so their explanation is omitted.

The above is the data processing procedure in the fourth example. Using these processes, the same effect as the third example can be obtained by using the programs on the storage sub-system 1000*d*.

E. FIFTH EXAMPLE

<<E1. System Configuration>>

Figure 38:
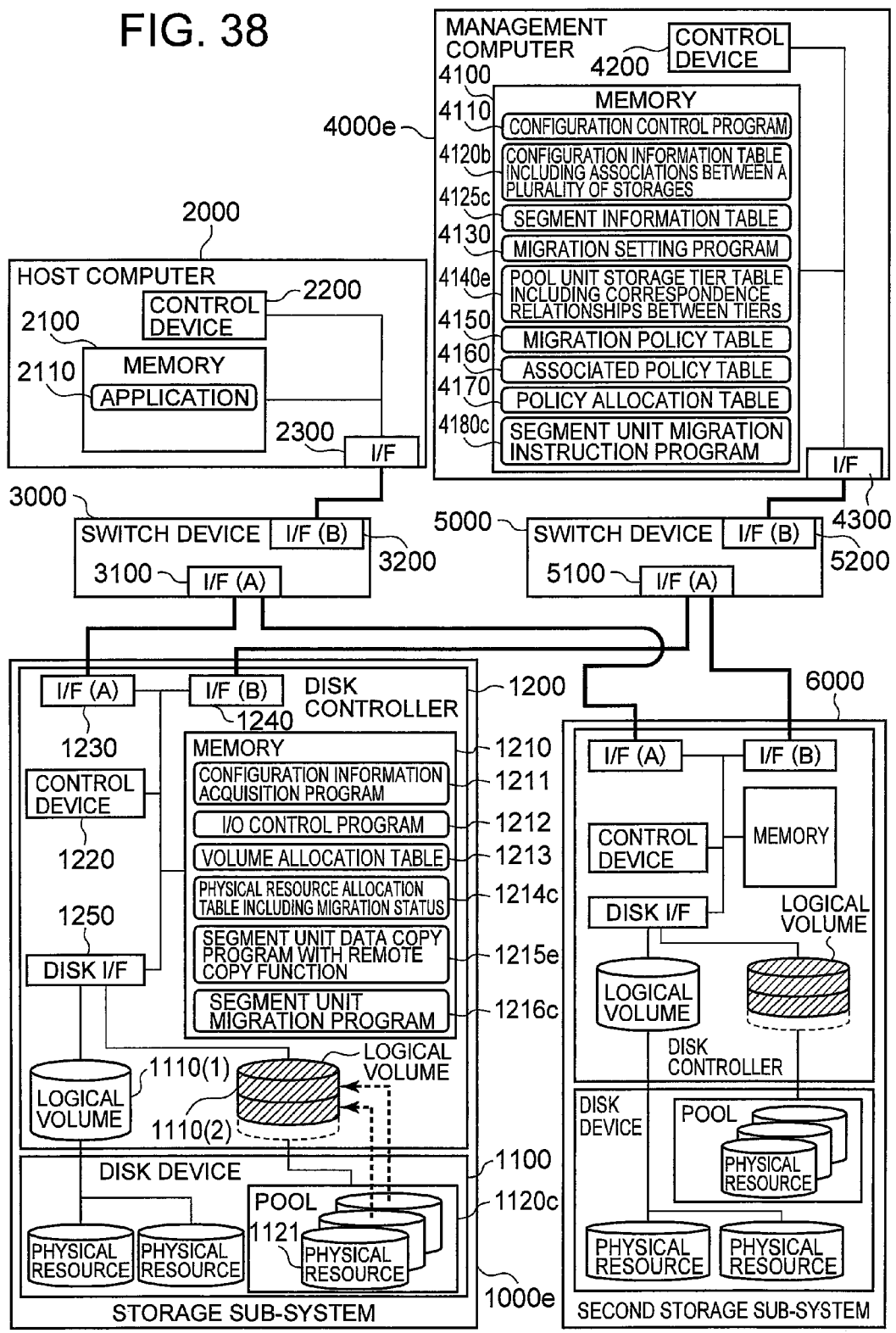
FIG. 38 is a diagram showing the system configuration in a fifth example.

FIG. 38 is an explanatory diagram showing the configuration of the data processing system as an example of the present invention. The data processing system includes a storage sub-system 1000*e*, a host computer 2000, a switch device 3000, a management computer 4000*e*, a switch device 5000, and a second storage sub-system 6000. In the figure, there is one each of the storage sub-system 1000*e*, the host computer 2000, the switch device 3000, the management computer 4000*e*, the switch device 5000, and the second storage sub-system 6000, but this is not a limitation, and there may be one or more of each. Most of the present configuration is the same as that of the third example, so in the following the differences only are explained.

The differences from the data processing system shown in FIG. 26 are the data processing system in the present example includes a second storage sub-system 6000, the storage sub-system 1000*e* has a segment unit data copy program 1215*e* with a remote copying function, and the management computer 4000*e* has a pool unit storage tier table 4140*e* that includes the correspondence relationships between tiers.

The second storage sub-system 6000 is the same as the storage sub-system 1000*e*, so its explanation is omitted.

The segment unit data copy program 1215*e* with the remote copying function is a program that copies data in segment units from logical volumes 1110 in the storage sub-system 1000*e* to logical volumes 1110 in the second storage system 6000. Copying of data by the program is achieved by transferring the data via an I/F(A) 1230 in the storage sub-system 1000*e*, an I/F(A) 3100 of the switch device 3000, and an I/F(A) 1230 of the second storage sub-system 6000.

The difference between the pool unit storage tier table 4140*c* shown in FIG. 30 and the pool unit storage tier table 4140*e* that includes the correspondence relationships between tiers shown in FIG. 39 is that the pool unit storage tier table 4140*e* that includes the correspondence relationships between tiers includes a second storage sub-system ID 41405*e*, a second pool ID 41406*e*, a second free capacity 41407*e*, and a second resource type 41408*e*.

<<E2. Explanation of the Data Processing Procedure>>

Most of the operation of the present example is the same as that of the third example, so in the following only the differences are explained. In the sequence of processes of the present example, the segment unit migration instruction process for the associated destination volume is different from that in the sequence of processes of the third example.

FIG. 40 shows the sequence of the segment unit migration instruction process for the associated destination volume in the present example.

Steps S5000*c*, S5010, S5020*c*, S5030*c*, S5040*c*, S5050*c*, and S5060*c* of this process are the same as steps S5000*c*, S5010, S5020*c*, S5030*c*, S5040*c*, S5050*c*, and S5060*c* of the segment unit migration instruction process for the associated destination volume shown in FIG. 34, so explanation of these steps is omitted.

In this process, in step S5070*e*, the segment unit migration instruction program 4180*c* refers to the configuration information table 4120*b* that includes associations between a plurality of storages, the pool unit storage tier table 4140*e* that includes the correspondence relationships between tiers, the segment information table 4125*c*, the migration policy table 4150, and the policy allocation table 4170, and selects a migration destination area for the segment of the volume found in step S5000*c*.

Next, in step S5080*e*, the segment unit migration instruction program 4180*c* instructs the segment unit migration program 1216*c* of the storage sub-system to carry out the segment unit migration for the volume found in step S5000*c*.

The details of the other processes carried out by programs are the same as the third example, so their explanation is omitted.

The above is the data processing procedure in the fifth example. Using these processes, it is possible to obtain the same effect as the third example even when the logical volume 1110 has relationships that extend across a plurality of storage sub-systems.

What is claimed is:

1. A computer system, comprising:
a storage system comprising:
a first virtual logical volume which is a copy source volume;
a second virtual logical volume which is a copy destination volume of the first virtual logical volume; and
a plurality of storage devices upon which a plurality of tiers are based at least in part, each tier comprising a plurality of storage areas,
wherein I/O (Input/Output) performance of each of the plurality of tiers is different; and
a controller configured to control data migration,
wherein the controller is configured to allocate an unallocated storage area among the plurality of storage areas to a write destination area in the first or second virtual logical volumes;
wherein the controller is configured to migrate first data from a first storage area allocated to the first virtual logical volume in a first tier of the plurality of tiers to a second storage area in a second tier of the plurality of tiers, which is different from the first tier, using a migration policy which defines the relationship between the plurality of tiers and I/O frequency ranges and allocate the second storage area to the first virtual logical volume on behalf of the first storage area,
wherein the controller is configured to migrate second data from a third storage area in a third tier of the plurality of tiers, allocated to the second virtual logical volume, and associated with the first storage area, to a fourth storage area in a fourth tier of the plurality of tiers which is different from the third tier, by using an associated policy which defines a migration destination tier of data in an associated destination storage area that is the same as a migration destination tier of data in an associated source storage area, and allocate the fourth storage area to the second virtual logical volume on behalf of the third storage area.

2. The computer system according to claim 1,
wherein the policy defined for storage areas associated with the first storage area is configured to select a storage area having a same type of storage device as the second storage area which is a migration destination of the first storage area, and
the storage device comprising the second storage area and the storage device having the fourth storage area are a same type.

3. The computer system according to claim 1, further comprising:
a management computer,
wherein the management computer comprises:
a configuration information table that comprises information indicating a pair relationship between the first storage area and the third storage area; and
a migration process instruction unit is configured to instruct the controller to carry out a migration process,
when the controller is configured to migrate the first data from the first storage area to the second storage area,
the migration process instruction unit is configured to refer to the configuration information table, and to identify the third storage area that has a pair relationship with the first storage area,
the migration process instruction unit is configured to select the fourth storage area, which is a storage area provided by a storage device of a same type as that of the second storage area, as a migration destination of the second data,
the migration process instruction unit is configured to instruct the controller to migrate the second data from the third storage area to the fourth storage area, and
the controller is configured to migrate the second data from the third storage area to the fourth storage area.

4. The computer system according to claim 1, further comprising:
a management computer,
wherein the management computer comprises:
a migration process instruction unit configured to instruct the controller to carry out a migration process;
a configuration information table that comprises information indicating a pair relationship between the first storage area and the third storage area;
an associated policy table comprising a plurality of policies indicating which storage area is to be selected as a migration destination of data in a storage area having a pair relationship with another storage area;
a policy allocation table indicating which of the plurality of policies is to be allocated to the plurality of storage areas,
wherein when the controller is configured to migrate the first data from the first storage area to the second storage area,
the migration process instruction unit is configured to refer to the configuration information table, and to identify the third storage area that has a pair relationship with the first storage area,
the migration process instruction unit is configured to refer to the policy allocation table and the associated policy table, and to select the fourth storage area as the migration destination of the third storage area,
the migration process instruction unit is configured to instruct the controller to migrate the second data from the third storage area to the fourth storage area, and
the controller is configured to migrate the second data from the third storage area to the fourth storage area.

5. The computer system according to claim 4,
wherein the associated policy table comprises:
information on a timing to migrate the second data; and
a condition for the first storage area when migrating the second data,
when the migration process instruction unit is configured to refer to the policy allocation table and the associated policy table,
and when the time of referring coincides with the timing in the associated policy table, and the first storage area satisfies the condition for the first storage area in the associated policy table,
the migration process instruction unit is configured to instruct the controller to migrate the second data.

6. The computer system according to claim 1,
wherein the controller has memory, and
the memory is configured to store:
a migration process program configured to migrate data from the first storage area to the second storage area,
a configuration information table comprising information indicating an association between the first storage area and the third storage area, and
a migration process instruction program configured to instruct the migration process program to carry out a migration process,
when the migration process program has been configured to migrate the first data from the first storage area to the second storage area, the migration process instruction program is configured to refer to the configuration information table, and to identify the third storage area that has an association with the first storage area, the migration process instruction program is configured to instruct the migration process program to migrate the second data from the third storage area to the fourth storage area, and the migration process program is configured to migrate the second data from the third storage area to the fourth storage area.

7. The computer system according to claim 6, wherein the memory comprises:

an associated policy table that includes the policy for selecting a migration destination storage area for the data in the third storage area; and a policy allocation table indicating the allocation of the policies to the storage areas, when the migration process program has been configured to migrate the first data from the first storage area to the second storage area, the migration process instruction program is configured to refer to the configuration information table, and to identify the third storage area that has an association with the first storage area, the migration process instruction program is configured to refer to the policy allocation table and the associated policy table, and to select the fourth storage area as the migration destination of the third storage area, the migration process instruction program is configured to instruct the migration process program to migrate the second data from the third storage area to the fourth storage area, and the migration process program is configured to migrate the second data from the third storage area to the fourth storage area.

8. The computer system according to claim 1, wherein the first storage area comprises a plurality of first partial storage areas, the second storage area comprises a plurality of second partial storage areas, the third storage area comprises a plurality of third partial storage areas, and the fourth storage area comprises a plurality of fourth partial storage areas, and when the controller is configured to migrate first partial data in the first partial storage area from the first partial storage area to the second partial storage area, the controller is configured to migrate second partial data in the plurality of third partial storage areas that have an association with the first partial storage area, from the third partial storage areas to the fourth partial storage areas.

9. The computer system according to claim 8, further comprising a management computer, wherein the management computer comprises:

a configuration information table that comprises information indicating an association between the first storage area and the third storage area;

a partial storage area information table that comprises information indicating an association between the storage area and the partial storage areas; and a migration process instruction unit configured to instruct the controller to carry out a migration process, when the controller has been configured to migrate the first partial data from the first partial storage area to the second partial storage area, the migration process instruction unit is configured to refer to the configuration information table and the partial storage area information table, and to identify the third partial storage area having an association with the first partial storage area, the migration process instruction unit is configured to instruct the controller to migrate the second partial data from the third partial storage area to the fourth partial storage area, and the controller is configured to migrate the second partial data from the third partial storage area to the fourth partial storage area.

10. The computer system according to claim 1, wherein the controller is further configured to:

migrate data for which I/O frequency is low to a tier for which I/O performance is low, according to the migration policy;

migrate the second data using the associated policy regardless of I/O frequency of the second data.

11. A computer system, comprising:

a plurality of storage systems including a first storage system and a second storage system, wherein the first storage system comprises:

a first virtual logical volume;

a plurality of storage devices upon which a first plurality of tiers are based at least in part, each tier comprising a first plurality of storage areas, comprising a first storage area and a second storage area;

wherein I/O (Input/Output) performance of each of the first plurality of tiers is different; and a first controller configured to control data migration from the first storage area to the second storage area, wherein the first controller is configured to allocate an unallocated storage area among the first plurality of storage areas to a write destination area in the first or second virtual logical volumes;

wherein the second storage system comprises:

a second virtual logical volume;

a plurality of storage devices upon which a second plurality of tiers are based at least in part, each tier comprising a second plurality of storage areas comprising a third storage area and a fourth storage area;

wherein I/O (Input/Output) performance of each of the second plurality of tiers is different; and a second controller configured to migrate data from the third storage area to the fourth storage area, wherein the first controller is configured to migrate first data from the first storage area allocated to the first virtual logical volume in a first tier of the first plurality of tiers to the second storage area in a second tier of the first plurality of tiers, which is different from the first tier, using a migration policy which defines the relationship between the first plurality of tiers and I/O frequency ranges and allocate the second storage area to the first virtual logical volume on behalf of the first storage area, wherein the second controller is configured to migrate second data from the third storage area in a third tier of the second plurality of tiers, allocated to the second virtual logical volume, that has an association with the first storage area, to the fourth storage area in a fourth tier of the second plurality of tiers which is different from the third tier, by using an associated policy which defines a migration destination tier of data in an associated destination storage area that is the same as a migration destination tier of data in an associated source storage area, and allocate the fourth storage area to the second virtual logical volume on behalf of the third storage area.

12. The computer system according to claim 11, further comprising a management computer,
wherein the management computer comprises:
a configuration information table that comprises information indicating an association between the first storage area and the third storage area, information on the first storage system that includes the first storage area, and information on the second storage system that includes the third storage area; and
a migration process instruction unit configured to instruct the first controller and the second controller to carry out a migration process,
the migration process instruction unit is configured to refer to the configuration information table, and to identify the third storage area which has an association with the first storage area,
the migration process instruction unit is configured to instruct the second controller to migrate the second data from the third storage area to the fourth storage area.

13. The computer system according to claim 11, wherein the controller is further configured to:
migrate data for which I/O frequency is low to a tier for which I/O performance is low, according to the migration policy;
migrate the second data using the associated policy regardless of I/O frequency of the second data.

* * * * *

UNITED STATES PATENT AND TRADEMARK OFFICE
CERTIFICATE OF CORRECTION

| | | |
|---|---|---|
| PATENT NO. | : 8,447,941 B2 | Page 1 of 1 |
| APPLICATION NO. | : 12/621121 | |
| DATED | : May 21, 2013 | |
| INVENTOR(S) | : Kono et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this
Sixteenth Day of December, 2014

Michelle K. Lee
*Deputy Director of the United States Patent and Trademark Office*